(12) United States Patent
Feldman et al.

(10) Patent No.: US 11,968,601 B2
(45) Date of Patent: Apr. 23, 2024

(54) SYSTEM AND METHODS FOR ASSET TRACKING, ASSET GROUPING, AND ERROR RECOVERY

(71) Applicant: ZaiNar, Inc., Redwood City, CA (US)

(72) Inventors: Alexander Feldman, San Ramon, CA (US); Phillip B. Hess, Redwood City, CA (US); Philip Adam Kratz, San Carlos, CA (US); Srdjan Miocinovic, Redwood City, CA (US); Jonathan Shiao-En Lu, Cupertino, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

(21) Appl. No.: 18/137,380

(22) Filed: Apr. 20, 2023

(65) Prior Publication Data

US 2023/0379665 A1 Nov. 23, 2023

Related U.S. Application Data

(60) Provisional application No. 63/411,554, filed on Sep. 29, 2022, provisional application No. 63/333,101, filed on Apr. 20, 2022.

(51) Int. Cl.
*H04W 24/00* (2009.01)
*H04W 4/029* (2018.01)
*H04W 4/06* (2009.01)
*H04W 72/12* (2023.01)
*H04W 84/18* (2009.01)

(52) U.S. Cl.
CPC ............. *H04W 4/06* (2013.01); *H04W 4/029* (2018.02); *H04W 72/12* (2013.01); *H04W 84/18* (2013.01)

(58) Field of Classification Search
CPC ........ H04W 4/06; H04W 4/029; H04W 72/12
See application file for complete search history.

(56) References Cited

U.S. PATENT DOCUMENTS

| | | | |
|---|---|---|---|
| 673,628 | A | 5/1901 | Scribner et al. |
| 5,828,670 | A | 10/1998 | Narasimha et al. |
| 5,920,287 | A | 7/1999 | Belcher et al. |

(Continued)

OTHER PUBLICATIONS

International Search Report and Written Opinion for International Application No. PCT/US23/19313, dated Sep. 1, 2023; 15 pages.

(Continued)

*Primary Examiner* — Erika A Washington
(74) *Attorney, Agent, or Firm* — Run8 Patent Group, LLC; Peter Miller

(57) ABSTRACT

A method includes, generating a schedule for an asset tag, the schedule defining: a unicast trigger time for transmission of a unicast trigger to the asset tag; a transmit time succeeding receipt of the multicast trigger; and a wake window intersecting the transmit time and the receipt of the multiact trigger. The method also includes transmitting the schedule from a node network to the asset tag and configuring the asset tag based on the schedule. The method also includes, at the node network, broadcasting the unicast trigger and, at an asset tag: entering a wake mode; receiving the unicast trigger; transmitting a ranging signal; and entering the sleep mode. The method further includes, at the node network: deriving location of the asset tag based on instance of the ranging signal received by nodes in the node network.

20 Claims, 4 Drawing Sheets

(56) References Cited

U.S. PATENT DOCUMENTS

| | | | |
|---|---|---|---|
| 6,040,805 | A | 3/2000 | Huynh et al. |
| 6,237,051 | B1 | 5/2001 | Collins |
| 6,445,927 | B1 | 9/2002 | King et al. |
| 6,490,727 | B1 | 12/2002 | Nazarathy et al. |
| 6,920,287 | B1 | 7/2005 | Hinds et al. |
| 7,177,656 | B2 | 2/2007 | Pinault |
| 7,302,269 | B1 | 11/2007 | Crawford et al. |
| 7,688,349 | B2 | 3/2010 | Flickner et al. |
| 7,839,916 | B1 | 11/2010 | Luecke et al. |
| 7,924,153 | B1 | 4/2011 | Furey et al. |
| 7,957,336 | B2 | 6/2011 | Amos et al. |
| 8,223,009 | B2 | 7/2012 | Anderson et al. |
| 8,300,615 | B2 | 10/2012 | Copeland et al. |
| 8,314,704 | B2 | 11/2012 | Cova et al. |
| 8,570,904 | B2 | 10/2013 | Lemkin et al. |
| 8,674,822 | B2 | 3/2014 | Priyantha et al. |
| 9,110,157 | B2 | 8/2015 | Levin et al. |
| 9,449,202 | B2 * | 9/2016 | Clare .................. G06K 7/0008 |
| 9,734,480 | B2 | 8/2017 | Kerai |
| 9,945,940 | B2 | 4/2018 | Min et al. |
| 10,371,789 | B2 | 8/2019 | Takizawa |
| 10,455,350 | B2 | 10/2019 | Kratz et al. |
| 10,627,474 | B1 | 4/2020 | Kratz et al. |
| 10,681,500 | B2 | 6/2020 | Kratz et al. |
| 10,911,211 | B1 | 2/2021 | Kratz et al. |
| 2007/0205944 | A1 | 9/2007 | Lyons |
| 2010/0039280 | A1* | 2/2010 | Holm ................ G06K 19/0717 |
| | | | 340/669 |
| 2010/0114407 | A1 | 5/2010 | Klooster et al. |
| 2011/0074552 | A1 | 3/2011 | Norair et al. |
| 2012/0143397 | A1 | 6/2012 | Mackay et al. |
| 2012/0311149 | A1 | 12/2012 | Trevino et al. |
| 2013/0324154 | A1 | 12/2013 | Raghupathy et al. |
| 2014/0055243 | A1 | 2/2014 | Kerai |
| 2014/0256347 | A1 | 9/2014 | Lakhzouri et al. |
| 2014/0270805 | A1 | 9/2014 | Mani |
| 2014/0288996 | A1 | 9/2014 | Rence et al. |
| 2014/0327521 | A1 | 11/2014 | Chen et al. |
| 2015/0168543 | A1* | 6/2015 | Tian .......................... G01S 1/68 |
| | | | 342/458 |
| 2015/0358930 | A1 | 12/2015 | Navalekar et al. |
| 2015/0362581 | A1 | 12/2015 | Friedman et al. |
| 2017/0013398 | A1 | 1/2017 | Farrell |
| 2018/0014151 | A1 | 1/2018 | Kratz et al. |
| 2018/0041329 | A1 | 2/2018 | Wang et al. |
| 2018/0110020 | A1 | 4/2018 | Sahlin et al. |
| 2018/0227850 | A1 | 8/2018 | Bregante |
| 2019/0037359 | A1 | 1/2019 | Begeja et al. |
| 2019/0058556 | A1 | 2/2019 | Siomina et al. |
| 2019/0072636 | A1 | 3/2019 | Herrn et al. |
| 2019/0191403 | A1 | 6/2019 | Goel et al. |
| 2019/0238292 | A1 | 8/2019 | Siomina et al. |
| 2019/0280898 | A1 | 9/2019 | Kumar et al. |
| 2019/0369201 | A1 | 12/2019 | Akkarakaran et al. |
| 2019/0373594 | A1 | 12/2019 | Sadiq et al. |
| 2020/0112498 | A1 | 4/2020 | Manolakos et al. |

OTHER PUBLICATIONS

Notification of the International Application No. and of the International Filing Date for International Application No. PCT/US23/19313, dated May 5, 2023; 1 page.

"GPS Accuracy," http://www.gps.gov/systems/gps/performance/accuracy/ (Accessed Jul. 12, 2018).

Dual GPS Solutions, "XGPS150A," http://gps.dualav.com/explore-by-product/xgps150a/ (Accessed Mar. 2, 2016.).

Kalisz, Jozef. "Review of methods for time interval measurements with picosecond resolution" Metrologia 411 (2003).

Kevin Curran, Eoghan Furey, Tom Lunney, Jose Santos, Derek Woods and Aiden Mc Caughey, "An Evaluation of Indoor Location Determination Technologies," Journal of Location Based Services vol. 5, No. 2, pp. 61-78 (2011).

Kiang, Jie, and Kyle Jamieson. "Array Track: a fine-grained indoor location system." Presented as part of the 1othUSENIX Symposium on Networked Systems Design and Implementation (NSDI 13). 2013.

Notice of Allowance issued in U.S. Appl. No. 16/186,336 dated Dec. 10, 2019.

Office action issued in U.S. Appl. No. 16/186,336 dated Oct. 24, 2019.

Office Action received in U.S. Appl. No. 17/080,729 dated Nov. 1, 2022.

Office action received in U.S. Appl. No. 16/814,285 dated May 11, 2020.

Paul A Zanderberg, "Accuracy of iPhone Locations: A Comparison of Assisted GPS, WiFi and Cellular Positioning," Transactions in GIS, 13(s1): 5-26 (2009.).

William J Hughes Technical Center, "Global Positioning System (GPS) Standard Positioning Service (SPS) Performance Analysis Report" (Jul. 31, 2014.).

* cited by examiner

SYSTEM AND METHODS FOR ASSET TRACKING, ASSET GROUPING, AND ERROR RECOVERY

CROSS-REFERENCE TO RELATED APPLICATIONS

This application claims the benefit of U.S. Provisional Application No. 63/333,101, filed on 20 Apr. 2022, and U.S. Provisional Application No. 63/411,554, filed on 29 Sep. 2022, each of which is incorporated in its entirety by this reference.

TECHNICAL FIELD

This invention relates generally to the field of asset tags and more specifically to a new and useful system and method for asset tag tracking, grouping, and error recovery in the field of asset tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
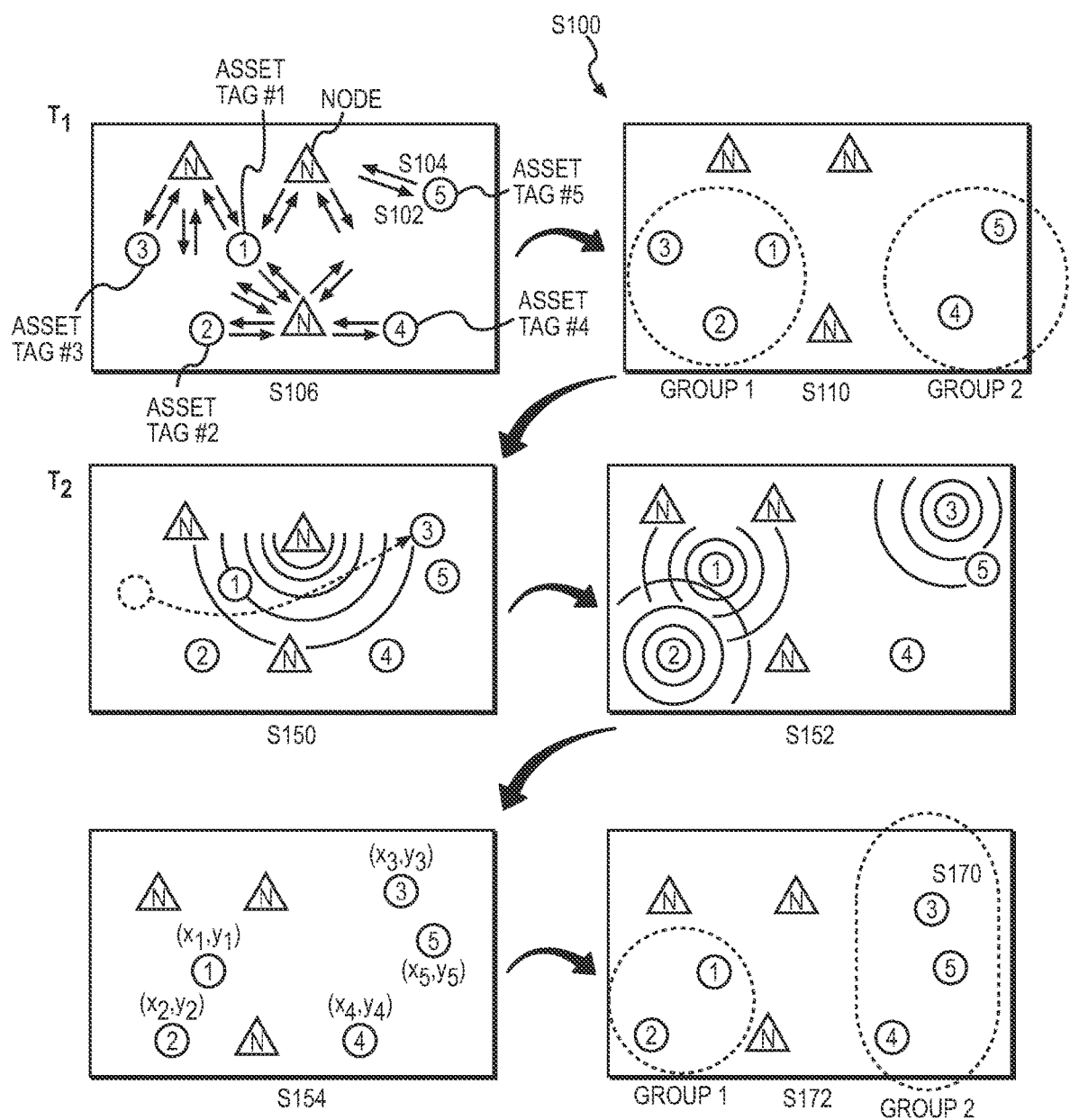
FIG. 1 is a schematic representation of a method.
Figure 2:
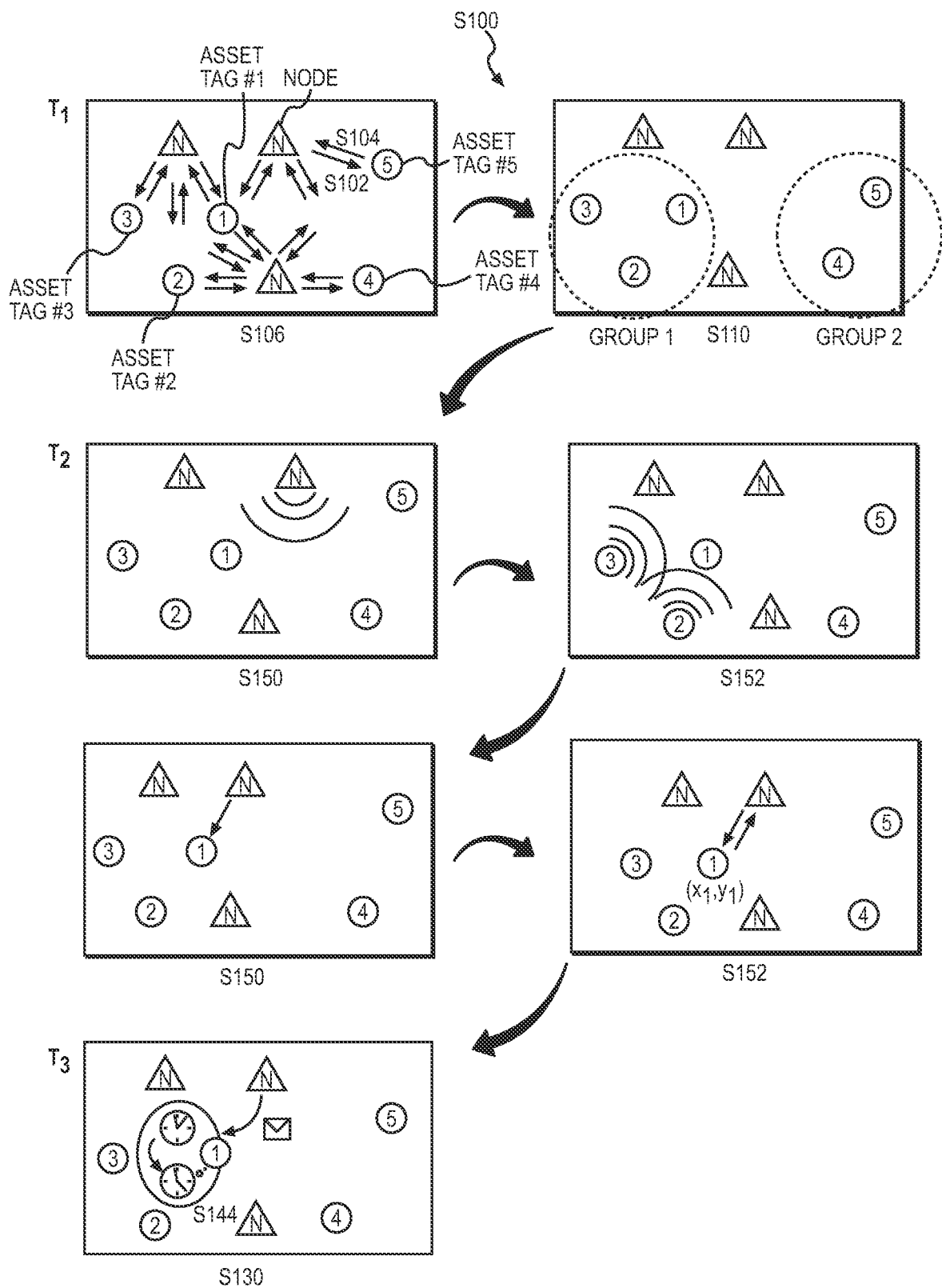
FIG. 2 is a schematic representation of one variation of the method.
Figure 3:
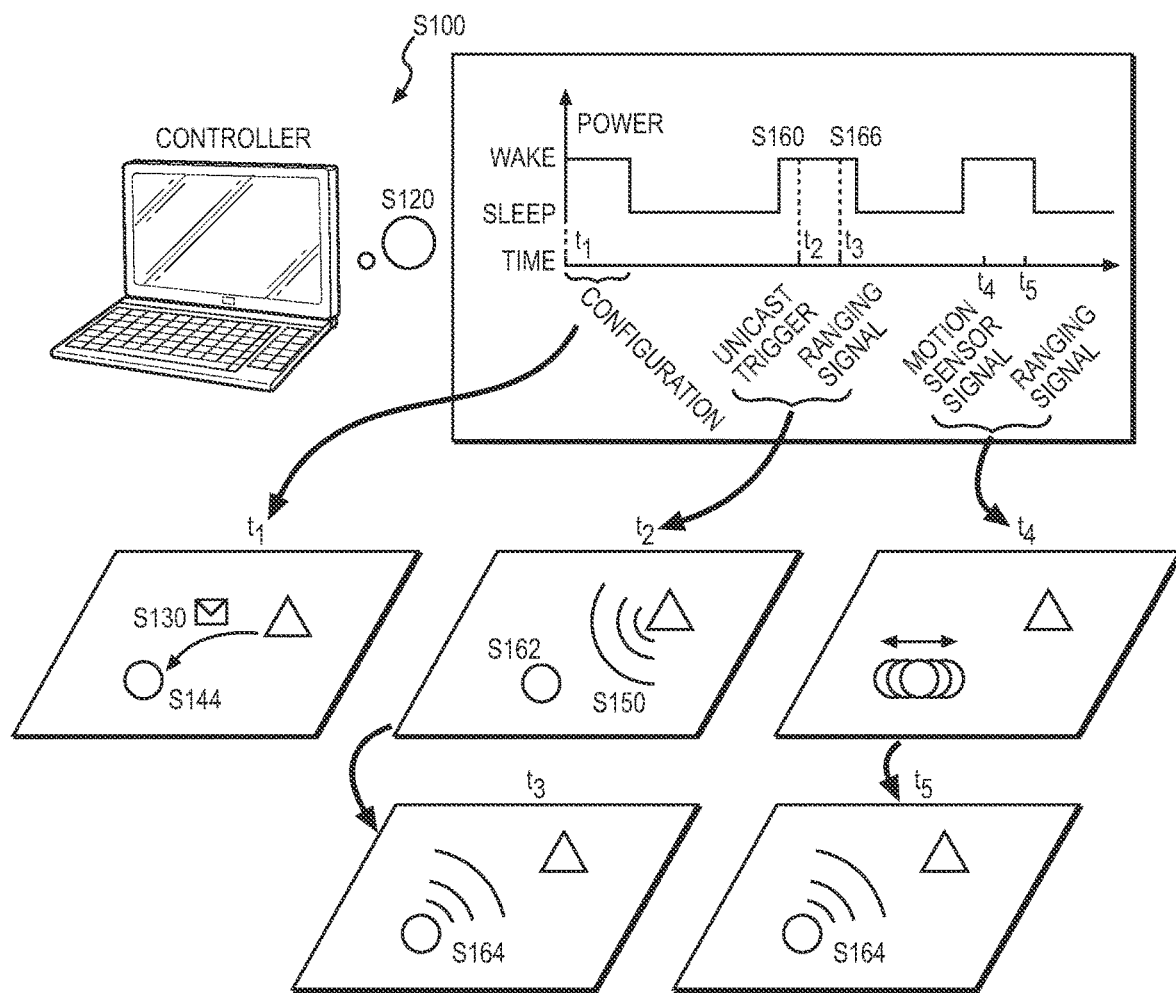
FIG. 3 is a schematic representation of one variation of the method.
Figure 4:
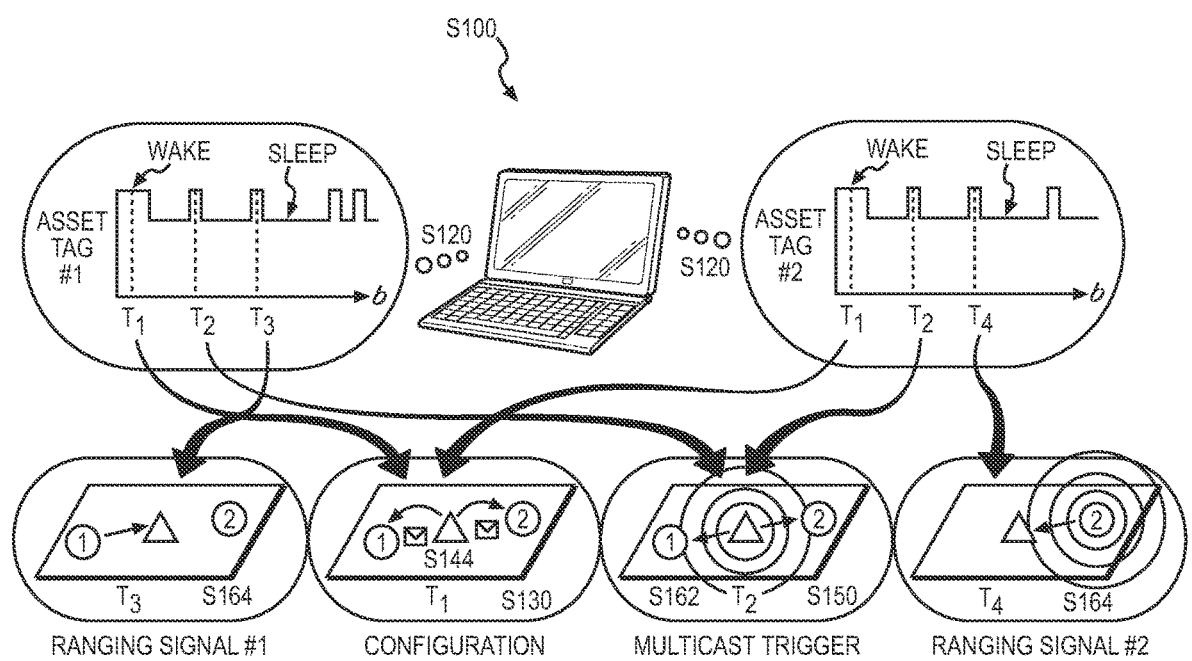
FIG. 4 is a schematic representation of one variation of the method.

As shown in FIGS. 1-4, a method S100 includes, at a first time, generating a first response schedule for a first asset tag in Block S120, the first response schedule defining: a sequence of trigger times for transmitting a sequence of unicast triggers; and a sequence of wake windows, each wake window in the sequence of wake windows intersecting a trigger time in the first sequence of trigger times.

In this variation, the method S100 further includes, at a first node of a set of nodes, broadcasting a first configuration message to the first asset tag via a configuration channel in Block S130, the first configuration message including the first response schedule, and at the first asset tag: in response to absence of configuration data, transitioning a transceiver of the first asset tag to the configuration channel in Block S140; receiving the first configuration message via the configuration channel in Block S142; configuring the first asset tag based on the first configuration message in Block S144; and, in response to a time duration until a first wake window, in the sequence of wake windows, exceeding a threshold time duration, entering a sleep mode in Block S146.

In this variation, the method S100 further includes, at a second time: at the first node in the set of nodes, based on a first trigger time in the sequence of trigger times, broadcasting the first unicast trigger, in the sequence of unicast triggers, via a ranging channel in Block S150. The method S100 also includes, at the second time and at the first asset tag: based on the first wake window, entering a wake mode in Block S162; in response to receiving the first unicast trigger via the ranging channel, transmitting a first ranging signal in Block S166; in response to transmitting the first ranging signal, entering the sleep mode Block S168; and, at the set of nodes receiving the first ranging signal in Block S152, deriving a first location of the first asset tag at the second time based on instances of the first ranging signal received by the set of nodes in Block S154.

1.1 Variation: Motion-Sensor-Activated Unicast Ranging

As shown in FIGS. 1-4, the method S100 includes, during a first time period, generating a first response schedule for a first asset tag in Block S120, the first response schedule defining: a first trigger time for transmitting a first unicast trigger; a first wake window intersecting the first trigger time; and a second wake window associated with a motion sensor signal.

In this variation, the method S100 also includes, at a first node of a set of nodes, broadcasting a first configuration message, including the first response schedule, to the first asset tag via a configuration channel in Block S130, and at the first asset tag: in response to absence of configuration data, transitioning a transceiver of the first asset tag to the configuration channel in Block S140; receiving the first configuration message via the configuration channel in Block S142; configuring the first asset tag based on the first configuration message in Block S144; and, in response to a time duration until a first wake window, in the sequence of wake windows, exceeding a threshold time duration, entering a sleep mode in Block S146.

In this variation, the method S100 also includes, during a second time period, at the first asset tag, and in response to receiving the motion sensor signal from a motion sensor in the first asset tag: entering a wake mode for a duration of the second wake window in Block S162; and transmitting a first ranging signal via a ranging channel during the second wake window in Block S166. The method S100 further includes, during the second time period and at the set of nodes: in response to transmitting the first ranging signal, entering the sleep mode in Block S168; receiving the first ranging signal in Block S152; and deriving a first location of the first asset tag based on instances of the first ranging signal received by the set of nodes in Block S154.

1.2 Variation: Multicast Configuration and Ranging

As shown in FIGS. 1-4, the method S100 includes, during a first time period, generating a first response schedule for a first asset tag group in Block S120, the first response schedule defining: a first multicast trigger time for transmission of the first multicast trigger to the first asset tag group; and, for each asset tag in the first asset tag group, a first wake window intersecting the first multicast trigger, a transmit time succeeding receipt of the first multicast trigger and unique to the asset tag, and a second wake window intersecting the transmit time.

In this variation, the method S100 also includes, at a first node of a set of nodes, broadcasting a first configuration message via a configuration channel to the first asset tag group in Block S130 and at the first asset tag in the first asset tag group. In this variation, the method S100 also includes, in response to absence of configuration data: transitioning a transceiver of the first asset tag to the configuration channel in Block S140; receiving the first configuration message via the configuration channel in Block S142; configuring the first asset tag based on the first configuration message in Block S144; and, based on the first response schedule indicating that a time duration until the first wake window exceeds a threshold time duration, entering a sleep mode in Block S146.

In this variation, the method S100 also includes, during the first wake window and at the set of nodes, broadcasting the first multicast trigger via a ranging channel in Block S150 and at the first wake widow, at the first asset tag in the first asset tag group: entering a wake mode in Block S162; receiving the first multicast trigger via the ranging channel in Block S164; and, based on the first response schedule indicating that a time duration until the second wake window exceeds the threshold time duration, entering the sleep mode in Block S168.

In this variation, the method S100 also includes, during the second wake window, at the first asset tag in the first asset tag group: entering the wake mode in Block S162; transmitting a first ranging signal via the ranging channel in Block S166; and, in response to transmitting the first ranging signal, entering the sleep mode in Block S168. The method S100 further includes, at the second wake window, at the set of nodes: receiving a first set of ranging signals from the first asset tag group in Block S152; and deriving a first set of locations of the first asset tag group based instances of the first set ranging signal received by the set of nodes in Block S154.

1.3 Variation: Unresponsive Asset Tag Recovery

As shown in FIGS. 1-4, the method S100 includes, during a first time period: at a set of nodes, broadcasting unicast queries to a population of asset tags in Block S102 and receiving a first set of uncast responses from the population of asset tags in Block S104; and calculating a first set of locations of the population of asset tags based on the first set of unicast responses in Block S106.

In this variation, the method S100 also includes, segmenting the population of asset tags into a set of asset tag groups based on proximities of the first set of locations in Block S110 and, for a first asset tag group in the set of asset tag groups, generating a first response schedule in Block S120, the first response schedule defining: a first multicast trigger time for transmission of the first multicast trigger; and, for each asset tag in the first asset tag group, a first transmit time succeeding receipt of the first multicast trigger and unique to the asset tag and a first wake window intersecting first multicast trigger time and a second wake window intersecting the first transmit time.

In this variation, the method S100 also includes, during a second time period: at a first node in the set of nodes, broadcasting the first multicast trigger at the first multicast trigger time defined by the first response schedule in Block S150; at the set of nodes, receiving a first set of ranging signals from a first asset tag subgroup in the first asset tag group in Block S152, the first asset tag subgroup responsive to the first multicast trigger; and, in response to identifying a first asset tag that is included in the first asset tag group and excluded from the first asset tag subgroup based on the first set of ranging signals in Block S110, generating a recovery schedule for the first asset tag in Block S120, the recovery schedule defining a sequence of unicast trigger times for transmission of a sequence of unicast triggers to the first asset tag. The method S100 further includes: during the second time period and at the first node in the set of nodes, broadcasting the sequence of unicast triggers at the sequence of unicast trigger times according to the recovery schedule in Block S150; and, at the set of nodes and in response to receiving a first ranging signal from the first asset tag, deriving a first location of the first asset tag based on the first ranging signal in Block S152.

1.4 Variation: Motion-Sensor-Activated Multicast Ranging

As shown in FIGS. 1-4, the method S100 includes, at a first time, at a set of nodes: broadcasting unicast queries to a population of asset tags in Block S102; receiving a first set of uncast responses from the population of asset tags in Block S104; and calculating a first set of locations of the population of asset tags based on the first set of unicast responses in Block S106. The method S100 further includes, segmenting the population of asset tags into a set of asset tag groups based on the first set of locations in Block S110 and, for a first asset tag group in the set of asset tag groups, generating a first response schedule in Block S120, the first response schedule defining: a first set of multicast trigger times for transmission of a first set of multicast triggers; and, for each asset tag in the first asset tag group, a first set of wake windows, each wake window in the first set of wake windows intersecting a multicast trigger time in the first set of multicast trigger times and a first transmit frequency of for ranging signals, the first transmit frequency unique to the asset tag.

In this variation, the method S100 also includes, at a second time: at the set of nodes, broadcasting a first multicast trigger of the first set of multicast triggers in Block S150; at the set of nodes, receiving a first set of ranging signals from a first asset tag group responsive to the first multicast trigger in Block S152; deriving a second set of locations of the first asset tag group based on the first set of ranging signals in Block S154; and identifying a first asset tag in the first asset tag group based on a first location, in the second set of locations, of the first asset tag in Block S110. The method S100 further includes, at the second time: in response to identifying the first asset tag, updating the first response schedule to exclude the first asset tag from the first asset tag group in Block S172; and generating a second response schedule for the first asset tag in Block S120, the second response schedule defining a first set of unicast trigger times for transmission of a first set of unicast triggers, a second set of wake windows, each wake window in the second set of wake windows intersecting a multicast trigger time in the first set of unicast trigger times, and a second transmit frequency unique to the first asset tag.

In this variation, the method S100 also includes: at a third time and at the set of nodes, broadcasting a first unicast trigger, in the first set of unicast triggers, according to the second response schedule in Block S150; and, at a fourth time and at the set of nodes, broadcasting a second multicast trigger, in the first set of multicast triggers, according to the first response schedule in Block S150.

1.5 Variation: Receiving Ranging Signals with Various Signal Strengths

As shown in FIGS. 1-4, the method S100 includes, at a first time, identifying a first asset tag group in the population of asset tags S112, each asset tag in the first asset tag group defining a first priority level and, for a first asset tag group, generating a first response schedule in Block S120, the first response schedule defining: a first set of multicast trigger times associated with a first frequency of transmission for transmission of a first set of multicast triggers; and for each asset tag in the first asset tag group, a first set of transmit times succeeding a trigger time in the intersecting a trigger time in the first set of multicast trigger times and unique to the asset tag, and a first set of wake windows, each wake window in the first set of wake windows intersecting a trigger time in the first set of multicast trigger times and unique to the asset tag and a transmit time in the first set of transmit times. The method S100 further includes, at the first time, broadcasting the first response schedule to the first asset tag group in Block S132.

In this variation, the method S100 also includes, at a second time, at a first node in a set of nodes: broadcasting the first multicast trigger at the first multicast trigger time, of the first set of multicast trigger times, defined by the first response schedule in Block S150; receiving a first set of ranging signals from a first asset tag subgroup in the first asset tag group in Block S152; and transmitting a first set of asset tag data of the first asset tag subgroup to the set of nodes in Block S158. The method S100 further includes, at the second time, a second node of the set of nodes: receiving a second set of ranging signals from a second asset tag subgroup in the first asset tag group in Block S152; transmitting a second set of asset tag data of the second asset tag subgroup with the set of nodes in Block S158; and deriving a second set of locations of the first asset tag group based on the first set of asset tag data and the second set of asset tag data in Block S154.

2. Applications

Generally, the method S100 is executed by a system including a set of nodes (e.g., mesh network of asset tag readers, network of base stations, network of asset tag readers communicatively coupled to a controller) and a population of asset tags to perform localization and ranging to track locations of one or more asset tags in the system. Furthermore, the method S100 can be executed in either a unicast communication mode, where a node in the set of nodes communicates with a single asset tag in the populating of asset tags at a time, or in a multicast communication mode, where a node in the set of nodes communicates with a group of asset tags in the population of asset tags at a time.

2.1 Unicast Communication Mode

Generally, the method S100 is executed by a system including a set of nodes (e.g., mesh network of asset tag readers, network of base stations, network of asset tag readers communicatively coupled to a controller) and at least one asset tag to: localize an asset tag in a target environment (e.g., a warehouse); generate a response schedule for the asset tag for exchange of unicast ranging signals with the set of nodes; configure the asset tag to adapt the response schedule; and derive position for the asset tag within the target environment based on ranging signals exchanged between the asset tag and the set of nodes. The method S100 is further executed by the system to enable the asset tag to toggle between a wake mode and a sleep mode to save battery power.

For example, the method S100 can be executed by the system to trigger ranging and localization of an asset tag in response to the asset tag detecting motion (e.g., due to being carried, transported). In particular, the asset tag can transmit a ranging signal to the set of nodes in response to receiving a motion sensor signal. For example, the method S100 includes, during a first time period, generating a first response schedule for a first asset tag, the first response schedule defining: a first trigger time for transmitting a first unicast trigger; a first wake window intersecting the first trigger time; and a second wake window associated with a motion sensor signal.

In this example, the method S100 also includes, at a first node of a set of nodes, broadcasting a first configuration message, including the first response schedule, to the first asset tag via a configuration channel, and at the first asset tag: in response to absence of configuration data, transitioning a transceiver of the first asset tag to the configuration channel; receiving the first configuration message via the configuration channel; configuring the first asset tag based on the first configuration message; and, in response to a time duration until a first wake window, in the sequence of wake windows, exceeding a threshold time duration, entering a sleep mode.

In this example, the method S100 also includes, during a second time period, at the first asset tag, and in response to receiving the motion sensor signal from a motion sensor in the first asset tag: entering a wake mode for a duration of the second wake window; and transmitting a first ranging signal via a ranging channel during the second wake window. The method S100 further includes, during the second time period and at the set of nodes: in response to transmitting the first ranging signal, entering the sleep mode; receiving the first ranging signal; and deriving a first location of the first asset tag based on instances of the first ranging signal received by the set of nodes.

2.2 Multicast Communication Mode

Generally, the method S100 is executed by a system including a set of nodes (e.g., asset tag readers, base stations), a population of asset tags, and a controller to: triangulate a population of asset tags in a target environment, such as a warehouse, during a setup period; cluster the population of asset tags into groups based on proximate locations; generate response schedules for the asset tags for transmission of ranging signals to nodes; and derive positions for the asset tags in the asset tag groups within the target environment. The method S100 is further executed by the system to: receive ranging signals from asset tags; localize asset tags within the target environment based on the ranging signals; responsive to absence of ranging signals from an asset tag in the asset tag group, generate recovery schedules for the asset tag excluded from the subset to elicit responses from the asset tag; and correct subsequent ranging signal transmission patterns to nodes.

For example, the system can be configured to execute the method S100 to triangulate initial positions of each asset tag deployed in the target environment (e.g., a warehouse, a grocery store). More specifically, during a setup period, the system can: broadcast a set of unicast signals to the population of asset tags; receive, at the set of nodes, a set of test responses from each asset tag; triangulate an initial position for each asset tag, within the target environment, based on the set of test responses; and record the initial location of each asset tag in a database. For example, at a first time, a set of nodes can broadcast unicast queries to a population of asset tags; each asset tag in the population of asset tags can return a set of test queries to the set of nodes; the set of nodes can record the set of test queries; and the controller can compute locations of the population of asset tags based on the set of test queries received by the set of nodes. Therefore, the system can maintain a set of initial locations associated with the population of asset tags in the target environment for subsequent grouping and tracking within the target environment.

In one implementation, the system can allocate asset tags into asset tag groups based on criteria, such as: proximity of asset tags to one another; a spatial region (e.g., a 10 m×10 m space); a threshold number of asset tags (e.g., a maximum, a minimum); a priority; a movement pattern/frequency, etc. In this implementation, the system can define a response schedule for each asset tag group, including parameters specific to the group (a multicast trigger time, a wake window, a set of asset tag transmit times). For example, the controller can: define a set of asset tag groups based on proximities of the locations of the population of asset tags; for a first asset tag group in the set of asset tag groups, define a response schedule including a multicast trigger time, a wake window intersecting the multicast trigger time, and a set of relative transmit times for each asset tag in the asset tag group; and transmit the response schedule to the populations of nodes. Therefore, the system can track asset tags within the asset tag group based on a multicast trigger transmitted to the asset tag group at a given time, and responses (ranging signals) from the asset tags based on the response schedule. Thus, the system can: consolidate asset tags into groups based on similar criteria; synchronize communication of asset tags in asset tag groups to nodes via a schedule defining a communication order for the asset tag group; transmit a query (e.g., a multicast signal) to the asset tag group; and receive responses from the asset tags in the asset tag group thereby increasing tracking frequency by reducing buffer time between signal transmissions of individual asset tags. Thus, the system can leverage wake windows of asset tags to allocate larger numbers of asset tags into asset tag groups for tracking in target environments by defining response schedules with multiple wake windows for a single asset tag group to trigger response from asset tags in subsets of asset tag groups in an "awake" operation state while other subsets of asset tag groups transition into "sleep" operation state.

2.2.1 Response Absence Detection and Recovery

In one implementation, the system can identify absence of ranging signals from an asset tag in the asset tag group. More specifically, due to a clock drift or malfunction, the asset tag may have transitioned into an "awake" state following the awake window (e.g., woke up too late) specified by the response schedule and therefore entered into a "sleep" state during/after the awake window and failed to receive the multicast trigger. In another implementation, the asset tag may have transitioned into the "awake" state prior to the awake window (e.g., woke up too early) specified by the response schedule and therefore entered into a "sleep" state during/before the awake window and failed to receive the multicast trigger. For example, at a second time, a first node in the set of nodes can broadcast a multicast trigger at the multicast trigger time to the first asset tag group. The set of nodes can receive a first set of ranging signals from a first subset of asset tags in the first asset tag group. The controller can, in response to identifying a first asset tag in the first asset tag group excluded from the first subset of asset tags, define a first recovery schedule for the first asset tag. Therefore, in response to ranging signal detection failure from an asset tag in the asset tag group, the system can generate a recovery schedule for the particular asset tag to induce response via ranging signals from the asset tag and subsequent localization.

In one implementation, the system can implement a hybrid of multicast and unicast communication to trigger response from the asset tags. More specifically, the system can implement unicast communication to induce response from the asset tag that was unresponsive to the multicast trigger and recalibrate a clock of the asset tag to correct clock errors (e.g., clock drift). For example, a first node in the set of nodes can: broadcast unicast triggers at the sequence of unicast trigger times according to the first recovery schedule; and in response to receipt of a first ranging signal from the first asset tag, recalibrate a first clock of the first asset tag; and the controller can, in response to receipt of the first ranging signal from the first asset tag by the first nodes, derive a first position of the first asset tag based on the first ranging signal. Therefore, the system can recover from clock desynchronization relative to true time or from clock times of other asset tags by recalibrating the clock of the asset tag which failed to transmit ranging signals based on the multicast trigger to resynchronize with the response schedule of the asset tag group.

The system can execute the method S100 within a warehouse facility—the target environment—occupied by a population of asset tags. More specifically, the asset tags can be deployed across the target environment and affixed to entities—such as, individual items (products), containers holding or storing items, machinery, etc.—in the warehouse to monitor throughput of products and/or movement of items within the warehouse or can be worn by employees to track movement of employees/groups of employees working or operating within the target environment.

3. System

In one implementation, the method S100 is executed by a system including: a set of nodes (e.g., a network base stations, a population of one or more asset tag readers), a population of asset tags, and a controller (e.g., a server communicatively connected to the set of nodes). More specifically, the system includes the set of nodes in communication with a population of asset tags characteristic of unsynchronized communication, and deployed in a target environment, specifically the asset tags described in U.S. Provisional Application 63/333,101, and a controller generally configured to derive locations of asset tags, define asset tag groups, define response and recovery schedules for the asset tag groups, and transmit the response and recovery schedules to the set of nodes.

4. Unicast Communication Mode

Generally, the method S100 is executed by a system including a set of nodes (e.g., mesh network of asset tag readers, network of base stations, network of asset tag readers communicatively coupled to a controller) and at least one asset tag to: localize an asset tag in a target environment (e.g., a warehouse); generate a response schedule for the asset tag for exchange of unicast ranging signals with the set of nodes; configure the asset tag to adapt the response schedule; and derive position for the asset tag within the target environment based on ranging signals exchanged between the asset tag and the set of nodes. The method S100 is further executed by the system to: receive ranging signals from the asset tag; and localize asset tags within the target environment based on the ranging signals. The method S100 is further executed by the system to enable the asset tag to toggle between wake mode and sleep mode to save battery power.

4.1 Generating a Response Schedule

Block S120 of the method S100 recites, via the set of nodes, generating a first response schedule for a first asset tag, the first response schedule defining: a sequence of trigger times for transmitting a sequence of unicast triggers; and a sequence of wake windows, each wake window in the sequence of wake windows intersecting a trigger time in the first sequence of trigger times. Generally, in Block S120, the system can generate a first response schedule defining times when unicast ranging triggers can be transmitted from a node in the set of nodes to the first asset tag and defining wake windows when the first asset tag can enter the wake mode to receive a unicast trigger, in the sequence of unicast triggers, and transmit the ranging signal. The first response schedule enables the first asset tag to enter the high-power consumption wake mode only when the first asset tag is communicating with the set of nodes. Thus, the first asset tag can remain in low-power-consumption sleep mode when the first asset tag is not communicating with the set of nodes. Thus, by generating the first response schedule, the system can reduce power consumption of the first asset tag and extend the battery life of the first asset tag.

In one implementation, the system can generate a first response schedule for a first asset tag, the first response schedule defining: a first trigger time for transmitting a first unicast trigger; a first wake window intersecting the first trigger time; and a second wake window associated with motion sensor signal. Therefore, the system can generate a first response schedule defining times when unicast ranging triggers can be transmitted from a node in the set of nodes to the first asset tag, and defining two wake windows: one wake window when the first asset tag can enter the wake mode to receive a unicast trigger; and another wake window when the first asset tag can enter the wake mode to transmit a ranging signal in response to receiving a motion sensor signal. Therefore, the first asset tag can initiate ranging in response to being moved.

4.2 Asset Tag Configuration

Blocks S130, S140, S142, and S144 of the method S100 recite, at a first node of a set of nodes, broadcasting a first configuration message to the first asset tag via a configuration channel, the first configuration message including the first response schedule and, at the first asset tag: in response to absence of configuration data, transitioning a transceiver of the first asset tag to the configuration channel; receiving the first configuration message via the configuration channel; and configuring the first asset tag based on the first configuration message. Generally, in Blocks S130, S140, S142, and S144, the system can transmit the configuration message including an asset tag identifier of the first asset tag and the first response schedule for the first asset tag. In addition, in Blocks S130, S140, S142, and S144, the system can, at the first asset tag, receive the configuration message via the configuration channel and configure the first asset tag based on the configuration message. In particular, the system can configure the first asset tag by synchronizing the clock of the first asset tag to the system time of the set of nodes and configuring the first asset tag to adapt the first response schedule. Therefore, the system can configure the first asset tag enabling the first asset tag to send ranging signals to the set of nodes, which can be used by the system to determine the location of the first asset tag.

In one implementation, the first asset tag can receive the first configuration message via the configuration channel by: accessing the first response schedule in the first configuration message; and accessing an asset tag identifier in the first configuration message. Further, the system can configure the first asset tag based on the first configuration message by: in response to the asset tag identifier in the configuration message matching an asset tag identifier of the first asset tag, synchronizing a clock of the first asset tag to a system time of the set of nodes; and configuring the first asset tag to transition between the sleep mode and the wake mode according to the first response schedule. Therefore, the system can verify that the configuration message is transmitted to the first asset tag based on the asset tag identifier contained in the configuration message. Furthermore, after verifying the asset tag identifier, the system can configure the first asset tag by synchronizing the clock of the first asset tag to the system time of the set of nodes and configuring the first asset tag to adapt the first response schedule.

In another implementation, the system can encrypt the configuration message in order to protect the information contained in the configuration message against corruption. In this implementation, the system can also implement decryption keys to decrypt the configuration message at the asset tag. In particular, the system can distribute an encryption key to the first asset tag and broadcasting the first configuration message to the first asset tag via the configuration channel by: generating an encrypted configuration message by encrypting the first configuration message; and broadcasting the encrypted configuration message to the first asset tag via the configuration channel. Further, the system can receive the first configuration message at the first asset tag via the configuration channel by decrypting the encrypted configuration message via the encryption key. Therefore, the system can encrypt the configuration message in order to secure the configuration information sent to the asset tags and to ensure reliability of asset tag tracking.

In another implementation, the system can transition an asset tag to the configuration channel in response to the asset tag not receiving a unicast trigger during the wake window. In this implementation, a first node in the set of nodes can broadcast a second unicast trigger via a ranging channel. In this implementation, the first asset tag can: based on a second wake window in the sequence of wake windows, enter the wake mode; in response to absence of receipt of the second unicast trigger via the ranging channel, transition the transceiver of the first asset tag to the configuration channel; receive a second configuration message, including system time of the set of nodes, via the configuration channel; and, based on the second configuration message, update a clock of the first asset tag according to the system time of the set of nodes. Therefore, in response to not receiving a unicast trigger during a wake window, which can occur due to clock drift of the asset tag or due to the asset tag being unconfigured, to the system can transition an asset tag to the configuration channel. Upon receiving the configuration message at the asset tag, the system can configure the asset tag, which can include synchronizing the clock of the asset tag with the clock of the set of nodes, and/or updating response schedule of the asset tag.

4.3 Ranging

Blocks S150, S168, S168, and S168 of the method S100 recite, at the first node in the set of nodes, based on a first trigger time in the sequence of trigger times, broadcasting the first unicast trigger, in the sequence of unicast triggers, via a ranging channel, and at the first asset tag: based on the first wake window, entering a wake mode; in response to receiving the first unicast trigger via the ranging channel, transmitting a first ranging signal; and, in response to transmitting the first ranging signal, entering the sleep mode. Generally, in Blocks S150, S168, S168, and S168 of the method S100, the system can trigger the nodes to range (e.g., characterize a distance to) the asset tag by transmitting a unicast trigger from a node in the set of nodes to the first asset tag and, while the first asset tag is in wake mode, receive the unicast trigger via the first asset tag and respond to the unicast trigger by transmitting a ranging signal. Furthermore, the system can transmit the unicast trigger and the ranging signal via the ranging channel, which is different from the configuration channel used for transmission of the configuration message. Therefore, the system can enable the first asset tag to transmit the ranging signal via the ranging channel, which can be used to derive the first location of the first asset tag. Moreover, the system can configure the first asset tag to enter the wake mode (e.g., high energy consumption mode) only when the first asset tag is about to receive the unicast trigger and transition the first asset tag to the sleep mode (e.g., low energy consumption mode) after the first asset tag has transmitted the first ranging signal. Thus, the system can reduce power consumption and increase battery life of the first asset tag by configuring the first asset tag to remain in the sleep mode when the first asset tag is not sending or receiving signals.

Block S152 and S154 of the method S100 recite, at the set of nodes: receiving the first ranging signal; and deriving a first location of the first asset tag at the second time based on instances of the first ranging signal received by the set of nodes. Generally, in Block S152 and S154 of the method S100, the system can derive the first location of the first asset tag based on instances of the first ranging signal received by the set of nodes. For example, the system can identify the time of flight of the first ranging signal and/or the unicast trigger exchanged by the first asset tag and a first node of the set of nodes. Then, based on the time of flight first ranging signal and/or the unicast trigger, the system can determine the distance between the first asset tag and the first node in the set of nodes. In this manner, the system can determine the distance between the first asset tag and each node in the set of nodes, and based on the distances and known locations of each node in the set of nodes, derive the location of the first asset tag. Thus, by periodically triggering ranging between the set of nodes and the first asset tag, the system can continuously track the location of the first asset tag (and the asset tagged the first asset tag).

In one implementation, the first node in the set of nodes can, during a third time period, based on a second trigger time in the sequence of trigger times, broadcast a second unicast trigger, in the sequence of unicast triggers, via the ranging channel. In this implementation, the first asset tag can: based on the second wake window, in the sequence of wake windows, enter the wake mode; in response to receiving the second unicast trigger via the ranging channel, transmit a second ranging signal; and, in response to transmitting the second ranging signal, enter the sleep mode. In this implementation, the set of nodes can: receive the first ranging signal; and derive a second location of the first asset tag based on instances of the second ranging signal received by the set of nodes. Therefore, the system can initiate ranging by transmitting ranging triggers at any trigger time in the sequence of trigger times. Furthermore, by periodically triggering ranging between the set of nodes and the first asset tag, the system can continuously track the location of the first asset tag (and the asset tagged the first asset tag).

In one implementation, the system can, based on the location of the first asset tag, generate notifications indicating the positioning and/or movement of the first asset tag. For example, the system can: calculate a distance between the first location (e.g., location derived at a first time) and the second location (e.g., location derived at a second time) of the first asset tag; in response to the distance exceeding a threshold distance, generate a notification indicating that an asset associated with the first asset tag has been moved by the distance exceeding the threshold distance; and transmit the notification to a device of an operator of a target environment containing the asset tag. Therefore, the system can transmit a notification indicating that an asset tag has been moved by a large distance to an operator of the target environment. Therefore, the system can: detect possible theft of an asset tag—and the associated object—from the target environment based on abnormal or atypical motion behaviors, positions, or locations of the asset tag; and prompt an operator of the target environment to investigate the asset tag and/or the associated above accordingly.

4.3.1 Sleep Mode Versus Wake Mode

In one implementation, the system can configure the first asset tag to enter the sleep mode by: disabling the transceiver of the first asset tag; transitioning a processor of the first asset tag into a sleep mode; and maintaining power supply from a battery of the first asset tag to a clock and a motion sensor of the first asset tag. In this implementation, the system can configure the first asset tag to enter the wake mode by: enabling the transceiver of the first asset tag; and transitioning the processor of the first asset tag into an active mode. Therefore, the first asset tag can consume less power when the first asset tag is in the sleep mode.

In another implementation, the system can configure the first asset tag to enter the sleep mode by drawing power from a battery of the first asset tag at a first power consumption rate. In this implementation, the system can configure the first asset tag to enter the wake mode by: drawing power from the battery of the first asset tag at a second power consumption rate exceeding the first power consumption rate. Therefore, by toggling between the sleep mode and the wake mode, the first asset tag can operate over longer periods of time than an asset tag that remains in the wake mode.

4.3.2 Ranging Channel Versus Configuration Channel

In one implementation, the system can broadcast the first configuration message to the first asset tag via the configuration channel by broadcasting a first configuration message to a first asset tag via a configuration channel associated with a first frequency. In this implementation, the system can broadcast the first unicast trigger via the ranging channel by broadcasting the first unicast trigger via a ranging channel associated with a second frequency range excluding the first frequency. In another example, the system can receive the first configuration message at a first frequency (e.g., first radio frequency), the first frequency associated with the configuration channel, and transmit a first ranging signal at second frequency (e.g., second radio frequency) within a second frequency range, the second frequency range excluding the first frequency. Thus, the system can define different frequencies for the configuration channel and the ranging channel in order to avoid interference between configuration messages and ranging signals.

4.4 Motion-Triggered Ranging

Blocks S160, S162, and S166 of the method S100 recite, at a first asset tag and in response to receiving the motion sensor signal from a motion sensor in the first asset tag: entering a wake mode for a duration of the second wake window; and transmitting a first ranging signal via a ranging channel during the second wake window. Further, Block S168 of the method S100 recites: at the first asset tag, in response to transmitting the first ranging signal, entering the sleep mode. Generally, in Blocks S160, S162, S166, and S168, the system can, at the first asset tag, in response to receiving a signal from a motion sensor, temporarily enter the wake mode and transmit a ranging signal. Therefore, the system can initiate ranging of the first asset tag in response to motion of the first asset tag.

Furthermore, in this implementation, the system can initiate ranging in response to both receiving a motion sensor signal and receiving a unicast trigger from a node in the set of nodes. In particular, in this implementation, the system can, prior to receiving the motion sensor signal, at a first node in the set of nodes: broadcast the first unicast trigger via the ranging channel. In this implementation, the system can further, at the first asset tag: enter the wake mode for the duration of a first wake window; in response to receiving the first unicast trigger via the ranging channel, transmit a second ranging signal via the ranging channel; and, in response to transmitting the second ranging signal, enter the sleep mode.

5. Multicast Communication Protocol

Generally, the method S100 is executed by a system including a set of nodes (e.g., mesh network of asset tag readers, network of base stations, network of asset tag readers communicatively coupled to a controller) and a population of asset tags to: localize each asset tag in the population of asset tags in a target environment (e.g., a warehouse); segment the population of asset tags into groups of asset tags based on locations of asset tags; generate a response schedule for an asset tag group, the response schedule facilitating an exchange of multicast triggers and ranging signals between the set of nodes and each asset tag in the asset tag group; configure each asset tag in the asset tag group to adapt the response schedule; in response to receiving a multicast trigger at the asset tag group, transmit ranging signals from each asset tag in the asset tag group; and, based on the ranging signals received by the set of nodes, derive positions of each asset tag in the asset tag group within the target environment.

5.1 Unicast Setup Period: Asset Tag Localization in the Target Environment

Blocks S102 and S104 of the method S100 recite, during a first time period and at a set of nodes: broadcasting unicast queries to a population of asset tags; and receiving a first set of uncast responses from the population of asset tags. Further, Block S106 recites, during the first time period, calculating a first set of locations of the population of asset tags based on the first set of unicast responses. Generally, in Blocks S102, S104, and S106, the system can determine the locations of the asset tags in the population of asset tags. For example, the set of nodes can transmit a unicast query to a first asset tag of the population of asset tags. After the unicast response from the first asset tag is received by subset of nodes, in the set of nodes, the system can determine the location of the first asset tag by a trilateration method. The set of nodes can then transmit a second unicast query to a second asset tag of the population of asset tags and, based on unicast response from the second asset tag, derive the location of the second asset tag. Repeating this process for each asset tag in the population of asset tags, the system can obtain the first set of locations of the population of assets. Therefore, the system can determine an initial location of each asset tag in the population of asset tags in the target environment.

In one implementation, the system can, at the first asset tag, receive a set of unicast queries from a set of nodes and transmit a unicast response, in a set of unicast responses, to the set of nodes. In this implementation, the system can further, at the set of nodes: compute a second location of the first asset tag based on the first set of unicast responses; and assign the first asset tag to the first asset tag group based on the second location. Therefore, the set of nodes can send out unicast queries to a population of asset tags and receive unicast responses to the queries from the population of asset tags. Then, based on the unicast responses, the system can determine a location of each asset tag in the population of asset tags. The system can then implement these locations to segment the population of asset tags into a set of asset tag groups.

In one variation, the system can setup a population of asset tags (e.g., identify initial locations for the population of asset tags) in a target environment for subsequent grouping and tracking based on communication with a set of nodes during a setup period. More specifically, the system can trigger a population of asset tags to respond to a set of nodes based on a set of queries directed to each asset tag upon deployment of the asset tags into a target environment to detect initial positions of each asset tag within the target environment.

In one implementation, the system can locate (e.g., triangulate) asset tags based on a set of response signals (e.g., test queries) received by the set of nodes in communication with the population of asset tags during a setup period. More specifically, a node within a set of nodes can broadcast a query (e.g., a packet of data) to an asset tag in a population of asset tags via a unicast communication protocol. In one implementation, the system can identify the node located at a closest distance to the population of asset tags from the set of nodes to broadcast the query. Responsive to reception of the query, the asset tag can return a test query to the node for recordation of the test query. For example, at a first time, at a set of nodes, the system can: broadcast unicast queries to a population of asset tags; at each asset tag in the population of asset tags, return a set of test queries to the set of nodes; at the set of nodes, record the set of test queries; and, at a controller, compute locations of the population of asset tags based on the set of test queries received by set of nodes. Therefore, the system can calculate initial positions of each asset tag in the population of asset tags, deployed across the target environment, based on the responses, or test queries received from the asset tags, for subsequent tracking and detection of asset tag movement within the target environment.

5.2 Asset Tag Group Allocation

Block S110 of the method S100 recites segmenting the population of asset tags into a set of asset tag groups, (e.g., based on proximities of the first set of locations of the population of asset tags). Generally, in Block S110, the system can assign each asset tag, in the population of asset tags, to an asset tag group, in a set of asset tag groups. For example, the system can assign asset tags that are within a threshold distance of neighboring asset tags to a first asset tag group. Therefore, the system can partition the population of asset tags into a set of asset tag groups. Furthermore, the set of nodes can communicate with all asset tags in an asset tag group simultaneously via a multicast communication mode (e.g., multicast ranging) instead of communicating with each asset tag in the asset tag group separately via a unicast communication mode (e.g., unicast ranging). By employing the multicast communication mode instead of a unicast communication mode, the system can monitor positions of a large population of asset tags (e.g., a population of more than 265 asset tags).

In one implementation, the controller can cluster a set of asset tags into an asset tag group based on a criterion, such as—a threshold distance between neighboring asset tags (e.g., within 20 m), a priority score, an entity type (e.g., an item type, a crate of items), a movement frequency (e.g., asset tag moves during 75% of a time period), a threshold asset tag group capacity (e.g., 20 asset tags per group), a threshold size of a geographic region (e.g., a 5 m×5 m region per group), etc. In one variation, the controller can cluster asset tags in the population of asset tags into groups based on threshold distances between asset tags. For example, at the first time, the controller can define a set of asset tag groups based on proximities of the locations of the population of asset tags. In one variation, the controller can cluster asset tags into asset tag groups based on a clustering technique (e.g., a connectivity model, a density model, a feature space). More specifically, the controller can map the population of asset tags in a multivariable feature space based on a set of criteria, and cluster the asset tags into asset tag groups responsive to identifying clusters of asset tags exhibiting similar characteristics. For example, at the first time, the controller can define a set of asset tag groups based on a clustering technique and a set of criteria. Therefore, rather than tracking a vast number (e.g., 100, 1000) of individual asset tags via individual unicast triggers, the system can consolidate asset tags into groups based on similar criteria and synchronized communication to reduce latency between identifying asset tags, thereby increasing tracking frequency of the population of asset tags.

In one implementation, the system can segment the population of asset tags into the set of asset tag groups based the first set of locations of the population of asset tags by: identifying a first asset tag group in the population of asset tags, the first subset of locations of the first asset tag group, in the first set of locations, within a threshold distance of the first node in the set of nodes; and identifying a second asset tag group in the population of asset tags, a second subset of locations of the second asset tag group, in the first set of locations, within the threshold distance of the second node in the set of nodes. Therefore, the system can segment a population of asset tags into two asset tag groups based on proximity of asset tags in each of these two groups to two nodes in the set of nodes. In particular, asset tags in the first asset tag group are located within the threshold distance of a first node of the set of nodes and asset tags in the second asset tag group are located within the threshold distance of the second node in the set of nodes.

In another implementation, the system can identify the first asset tag group defining a first priority level in the population of asset tags by identifying a first asset tag group in the population of asset tags based on a high priority level of merchandise tracked by the first asset tag group. In this implementation, the system can also identify a second asset tag group defining a second priority level in the population of asset tags by: identifying a second asset tag group in the population of asset tags based on a low priority level of merchandise tracked by the second asset tag group. Therefore, the system can segment the population of asset tags into asset tag groups based on the priority level of the merchandise tracked by the asset tags in the population of asset tags. For example, the system can include asset tags tracking high priority merchandise in the first asset tag group and include asset tags tracking low priority merchandise in the second asset tag group.

In another implementation, the system can identify the first asset tag group defining the first priority level in the population of asset tags by: identifying a first asset tag group in the population of asset tags based on a first subset of locations, in the first set of locations, corresponding to the first asset tag group located within a high priority area. In this implementation, the system can identify the second asset tag group in the population of asset tags, each asset tag in the first asset tag group defining the second priority level less than the first priority level, by: identifying a second asset tag group in the population of asset tags based on a second subset of locations, in the first set of locations, corresponding to the second asset tag group located within a low priority area. Therefore, the system can segment the population of asset tags into asset tag groups based on priority level of the area in the target environment where the asset tags are located. For example, the system can include asset tags located in a high priority area in the first asset tag group and include asset tags that are located in a low priority area in the second asset tag group.

In yet another implementation, the system can assign a unique identifier to each asset tag group to distinguish asset tag groups among the population of asset tags. More specifically, the controller can generate the unique identifier based on a set of characteristics descriptive of the asset tag group, such as—a number of asset tags (5, 20, 100), an entity type (cosmetics, food, clothing), a priority metric (high priority, low priority), etc. For example, the controller can: generate a unique identifier for the first asset tag group based on a set of characteristics associated with the asset tags in the asset tag group; and assign the unique identifier to the first asset tag group. Therefore, the system can monitor asset tags based on the unique identifier and distinguish between asset tag groups deployed in the target environment.

5.3 Scheduling of Ranging Triggers

Block S120 of the method S100 recites, for a first asset tag group in the set of asset tag groups, generating a first response schedule, the first response schedule defining: a first multicast trigger time for transmission of the first multicast trigger; for each asset tag in the first asset tag group, a first transmit time succeeding receipt of the first multicast trigger and unique to the asset tag; and a first wake window intersecting first multicast trigger time and a second wake window intersecting the first transmit time. Generally, in Block S120, the system can generate a first response schedule defining times when multicast ranging triggers can be transmitted from a node in the set of nodes to the first asset tag group and defining wake windows when each asset tag in the first asset tag group can enter the wake mode to receive the multicast trigger and transmit the ranging signal. The first response schedule enables each asset tag in the first asset tag group to enter the wake mode (e.g., high-power consumption mode) only when the asset tag is communicating with the set of nodes. Thus, each asset tag in the first asset tag group can remain in low-power-consumption sleep mode when the first asset tag is not communicating with the set of nodes. Thus, by generating the first response schedule, the system can extend the battery life of the asset tags in the first asset tag group.

Generally, the system can define a response schedule for a particular asset tag group. In one implementation, the controller can define a response schedule including: a multicast trigger time specifying a time associated with transmission of a multicast trigger signal from a node to the asset tag group, a wake window characterizing a target period of time during which an asset tag in the asset tag group transitions from a "sleep" operational state to an "awake" operational state to receive a multicast trigger signal, and a set of transit times specifying a target timestamp for each asset tag in the asset tag group to transmit a response (e.g., a ranging signal) to the set of nodes. The controller can then transmit the schedule to the populations of nodes for subsequent transmission of trigger signals to the asset tags based on the schedule. For example, at the first time, for a first asset tag group in the set of asset tag groups, the system can: define a response schedule including a multicast trigger time, a wake window intersecting the multicast trigger time, and a set of transmit times succeeding receipt of a trigger, each transmit time in the set of transmit times unique to one asset tag in the asset tag group; and transmit the response schedule to the populations of nodes. Therefore, the system reduces power consumption of asset tags by synchronizing communication with nodes during wake windows and maintaining asset tags in a sleep mode (low power mode) when the asset tag is not scheduled to communicate (e.g., transmit ranging signals to the node).

In one variation, the controller can define multiple response schedules for an asset tag group. For example, the controller can: define a first response schedule for a first subset of asset tags in the asset tag group, the first response schedule including a first multicast trigger time, a first wake window intersecting the first multicast trigger time, and a first set of transmit times succeeding receipt of a trigger, each transmit time in the first set of transmit times unique to one asset tag in the first subset of asset tags in the asset tag group; define a second response schedule for a second subset of asset tags in the asset tag group different than the first subset, the second response schedule including a second multicast trigger time, a second wake window intersecting the second multicast trigger time, and a second set of transmit times succeeding receipt of the trigger, each transmit time in the second set of transmit times unique to one asset tag in the second subset of asset tags in the asset tag group; and transmit the first response schedule and the second response schedule to the populations of nodes.

In one implementation, the system can identify a first asset tag group, in the population of asset tags, associated a first priority level. In this implementation, the system can also identify a second asset tag group in the population of asset tags, the second asset tag group associated with a second priority level less than the first priority level. The system can define a first response schedule for the first asset tag group, the first response schedule including a first set of multicast trigger times separated by a first time interval. The system can also define the second response schedule—for the second asset tag group—that includes a second set of multicast trigger times separated by a second time interval greater than the first time interval. In this implementation, the system can generate different response schedules for different asset tag groups. In particular, the system can generate the first response schedule for the first asset tag group associated with high priority tags and a second response schedule for a second asset tag group associated with low priority tags. In one example, the system can define a shorter time interval separating the multicast triggers in the first response schedule and a longer time interval separating the multicast triggers in the second response schedule. Therefore, the set of nodes can transmit multicast triggers to high priority asset tags at a higher frequency (e.g., at a shorter time interval) than to the low priority tags.

5.3.1 Time-Based Scheduling of Ranging Signals

In one variation, the system can generate a first response schedule for a first asset tag group, the first response schedule defining: a first multicast trigger time for transmission of the first multicast trigger to the first asset tag group; and, for each asset tag in the first asset tag group, a first wake window intersecting the first multicast trigger, a transmit time succeeding receipt of the first multicast trigger and unique to the asset tag, and a second wake window intersecting the transmit time. In this implementation, the system can ensure that the ranging signals from each asset tag in the asset tag group do not interfere by scheduling transmissions of the ranging signals of each asset tag in the first asset tag group at a time unique to each asset tag in the first asset tag group. In particular, in response to the first asset tag group receiving the multicast trigger: a first asset tag can transmit a first ranging signal at a first time; a second asset tag can transmit a second ranging signal at a second time succeeding the first time; and a third asset tag can transmit a third ranging signal at a third time succeeding the second time. The system can repeat this process for other tags in the first asset tag group. Thus, the system can transmit ranging signals from each asset tag in the first asset tag group to the set of nodes without interference of the ranging signals. In this implementation, some asset tags in the asset tag group can enter a wake window twice: at a first time to receive the multicast trigger; and at a second time, to transmit the ranging signal. For example, a first asset tag in the first asset tag group can, at a first time: enter a wake mode; receive the first multicast trigger; and, based on the response schedule indicating that a time duration until the second wake window exceeds the threshold time duration, enter a sleep mode. In this example, the first asset tag in the first asset tag group can, at a second time: enter the wake mode; transmit the first ranging signal; and, in response to transmitting the first ranging signal, enter the sleep mode. However, in this implementation, some asset tags in the first asset tag group can enter the wake mode only once to both receive the multicast trigger and transmit the ranging signal. For example, a second asset tag in the first asset tag group can, at a first time: enter the wake mode; in response to the first wake window of the second asset tag overlapping with the second wake window of the second asset tag, transmitting a second ranging signal; and, in response to transmitting the second ranging signal, entering the sleep mode.

5.3.2 Frequency-Based Scheduling of Ranging Signals

In one implementation, the system can, for a first asset tag group in the set of asset tag groups, generate a first response schedule defining: a first set of multicast trigger times for transmission of a first set of multicast triggers; and, for each asset tag in the first asset tag group, a first set of wake windows, each wake window in the first set of wake windows intersecting a multicast trigger time in the first set of multicast trigger times, and a first transmit frequency of for ranging signals, the first transmit frequency unique to the asset tag. In this implementation, the system prevent interference of the ranging signals transmitted by the asset tags in the first asset tag group by scheduling transmissions of the ranging signals from each asset tag in the first asset tag group at a frequency (e.g., radio frequency) unique to each asset tag in the first asset tag group. In particular, in response to the first asset tag group receiving the multicast trigger: a first asset tag can transmit a first ranging signal at a first frequency; a second asset tag can transmit a second ranging signal at a second frequency; and a third asset tag can transmit a third ranging signal at a third frequency. The system can repeat this process for each asset tag in the first asset tag group. Thus, the set of nodes can receive ranging signals from each asset tag in the first asset tag group at different frequencies (e.g., radio frequencies) without interference of the ranging signals.

5.3.3 Continuous Time and Frequency-based Scheduling of Ranging Signals

In one implementation, the system can, for a first asset tag group in the set of asset tag groups, generate a first response schedule defining a first set of multicast trigger times for transmission of a first set of multicast triggers. The first response schedule also defines, for each asset tag in the first asset tag group: a set of transmit time and frequency pairs, the set of transmit time and frequency pairs including a set of transmit times and a set of paired frequencies unique to the asset tag at each transmit time in the set of transmit times; and a first set of wake windows, each wake window in the first set of wake windows intersecting a multicast trigger time in the first set of multicast trigger times and each transmit time in the set of transmit time and frequency pairs. In this implementation, the system can ensure that the ranging signals from each asset tag in the first asset tag group do not interfere by scheduling transmissions of the ranging signals from each asset tag in the first asset tag group at multiple times following receipt of the multicast trigger and at a frequency unique to each asset tag in the first asset tag group. In one example, a sample asset tag group includes three asset tags. In this example, at a first time following receipt of the multicast trigger by the sample asset tag group: a first asset tag can transmit a first ranging signal at a first frequency; a second asset tag can transmit a second ranging signal at a second frequency; and a third asset tag can transmit a third ranging signal at a third frequency. In this example, at a second time succeeding the first time: the first asset tag can transmit a fourth ranging signal at the second frequency; the second asset tag can transmit a fifth ranging signal at the third frequency; and the third asset tag can transmit a sixth ranging signal at the first frequency. At a third time succeeding the second time: the first asset tag can transmit a seventh ranging signal at a third frequency; the second asset tag can transmit an eighth ranging signal at a first frequency; and the third asset tag can transmit a ninth ranging signal at a second frequency. Thus, the system can transmit ranging signals from each asset tag in the first asset tag group to the set of nodes without interference of the ranging signals. Furthermore, the system can achieve a higher sampling rate of the ranging signal by scheduling multiple ranging signal transmissions (e.g., transmission from the first asset tag, second asset tag third asset tag), each at a unique frequency, following receipt of the multicast trigger.

5.4 Asset Tag Configuration

Block S130 of the method S100 recites, at a first node in a set of nodes: broadcasting a first configuration message via a configuration channel to the first asset tag group. Blocks S140, S142, and S144 recite, at the first asset tag in the first asset tag group: in response to lacking configuration data, changing receive frequency of a transceiver to a frequency associated with the configuration channel; receiving the first configuration message via the configuration channel; and configuring the first asset tag based on the first configuration message. Block S146 recites, based on the first response schedule indicating that a time duration until the first wake window exceeds a threshold time duration, entering a sleep mode. Generally, in Blocks S130, S140, S142, and S144, the system can transmit the configuration message including a group identifier of the first asset tag group, the asset tag identifier of each asset tag in the first asset tag group, and the first response schedule for the first asset tag group. In addition, in Blocks S130, S140, S142, and S144, the system can, via the first asset tag, receive the configuration message via the configuration channel and configure each asset tag in the first asset tag group based on the configuration message. For example, the system can configure each asset tag in the first asset tag group by: synchronizing the clock of the asset tag to the system time of the set of nodes; assigning an asset tag ID and group ID to the asset tag; and adopting the first response schedule at the asset tag. Therefore, after configuration, each asset tag in the first asset tag group can receive multicast triggers from the set of nodes and transmit ranging signals to the set of nodes according to the first response schedule.

In one implementation, the system can receive the first configuration message via the configuration channel by: accessing the first response schedule in the first configuration message; accessing an asset tag identifier in the first configuration message; and accessing a group identifier in the first configuration message. In this implementation, the system can also configure the first asset tag based on the first configuration message by: in response to the asset tag identifier in the configuration message matching the asset tag identifier of the first asset tag and the group identifier in the configuration message matching the group identifier of the first asset tag group, configuring the first asset tag to transition between the sleep mode and the wake mode according to the first response schedule. Therefore, the system can verify that the configuration message is scheduled for the first asset tag in the first asset tag group based on the asset tag identifier and the group identifier contained in the configuration message. Furthermore, after verifying the asset tag identifier and the group identifier, the system can configure the first asset tag to adapt the first response schedule.

5.5 Ranging

Blocks S150, S152, and S154 of the method S100 recite, at the set of nodes: broadcasting the first multicast trigger at the first multicast trigger time defined by the first response schedule; receiving a first set of ranging signals from a first asset tag group responsive to the first multicast trigger; and, in response to receiving the first set of ranging signals from the first asset tag group, deriving a first set of locations of the first asset tag group based on the first set of ranging signals. Generally, in Blocks S150, S152, and S154, the system can trigger each asset tag in the first asset tag group to emit a ranging signal and, based on the set of ranging signals received by the set of nodes, calculate the location of each asset tag in the first asset tag group. In particular, the system can first compute a set of distances between each asset tag in the first asset tag group and a subset of nodes in the set of nodes (e.g., based on the time of flight of the ranging signal), and based on the set of distances, derive the first set of locations of the first asset tag group. Therefore, the system can derive a location, in a set of locations, of each asset tag in an asset tag group.

In one implementation, the system can transmit a trigger signal to the asset tags in the asset tag group to elicit a response from each asset tag. More specifically, a node in the set of nodes can transmit a multicast trigger signal to each asset tag in the asset tag group to trigger response back to the node via a ranging signal. For example, at a second time, a first node in the set of nodes can broadcast a multicast trigger at the multicast trigger time defined by the response schedule to each asset tag in the first asset tag group. Therefore, the multicast trigger can induce communication and response from the asset tag group to localize responsive asset tags in the asset tag group and detect unresponsive asset tags.

Further, the system can receive a response from each tag in the asset tag group and localize each asset tag based on a ranging signal associated with the response. In one implementation, the set of nodes can receive a set of responses (e.g., ranging signals) from the asset tag group. For example, at the second time, the set of nodes can: receive a first set of ranging signals from the first asset tag group; and, at the controller, derive positions of the asset tags based on the first set of ranging signals. Therefore, the system can localize each asset tag in the asset tag group based on the ranging signals received by the set of nodes.

In one implementation, a first node in the set of nodes can, during the first wake window: broadcast the first multicast trigger via a ranging channel. The first asset tag in the first asset tag group can, during the first wake window: enter a wake mode, receive the first multicast trigger via the ranging channel; and, based on the first response schedule indicating that a time duration until the second wake window exceeds the threshold time duration, enter the sleep mode. In this implementation, the first asset tag in the first asset tag group can further, during the second wake window: enter the wake mode; transmit a first ranging signal via the ranging channel; and, in response to transmitting the first ranging signal, enter the sleep mode. The set of nodes can further, during the second wake window: receive a first set of ranging signals from the first asset tag group; and derive a first set of locations of the first asset tag group based on the first set ranging signal. Therefore, the system can wake up twice and send out ranging signal with a delay.

In one variation, the set of nodes can receive a set of ranging signals from a portion of the asset tags in the asset tag group. For example, at the second time the set of nodes can receive a first set of ranging signals from a first subset of asset tags in the first asset tag group, and the controller can derive positions of the first subset of asset tags based on the first set ranging signals. Therefore, the system can detect absence of ranging signals from a subset of asset tags in a particular asset tag group due to asset tag communication errors and recover ranging signals not received from the subset of asset tags.

In one implementation, the system can: derive a set of locations of the first asset tag group based on the first set of ranging signals received from the first asset tag group; populate a digital map of the target environment with a second set of locations of the first asset tag subgroup; and render the digital map on a display of a device of an operator of the target environment. Therefore, the system can, generate visual representations of the locations of asset tags, the locations derived based on the ranging signals received from the asset tags. For example, the system can generate a digital map of the first asset tag group in the target environment. Furthermore, the system can update the visual representation of the locations of asset tags each time ranging triggers are received from the asset tags. For example, the system can update the map of the target environment to show the asset tags in the first asset tag group moving over time.

5.6 New Tag Deployment and Allocation

In one implementation, the system can predict and dynamically allocate new asset tags into existing groups based on group criteria (e.g., a target environment, a target movement scheme, a target entity) when new asset tags are deployed in the target environment. For example, during the first time, the controller can: identify a new asset tag including a set of target characteristics; predict an asset tag group for the new asset tag based on the set of target characteristics; and allocate the new asset tag into the first asset tag group.

In one variation, during the first time, the controller can: define a configuration message characterizing an asset tag group identifier (e.g., group_id) and a vector of asset tag identifiers (e.g., tag_ids) corresponding to the asset tags in the asset tag group. In this variation, the vector of asset tag identifiers can define an order of asset tags corresponding to a chronological order of trigger responses. Thus, the index of the asset tag identifier in the vector defines a trigger response order for the asset tag group. In this variation, the controller can transmit the configuration message to the population of asset tags in the target environment (e.g., an asset tag group). Each asset tag can then identify the asset tag identifier associated with the asset tag in the vector of asset tag identifiers. In response to identifying the asset tag identifier in the vector of asset tag identifiers, a new asset tag can integrate with the asset tag group based on the asset tag group identifier. The system can then transmit the response schedule for the asset tag group to the set of nodes for subsequent localization and ranging of the asset tag group. Therefore, the system can integrate new asset tags deployed in the target environment by allocating new asset tags into asset tag groups based on group characteristics and target behavior. In one implementation, the system can broadcast a configuration message to a set of target asset tags (e.g., prospective asset tags). For example, the set of prospective tags looking to be configured can receive the configuration message if the configuration message is broadcast.

5.7 Tag Regrouping

Blocks S170 and S172 of the method S100 recite: identifying a first asset tag in the first asset tag group based on a first location, in the second set of locations, of the first asset tag; and, in response to identifying the first asset tag, updating the first response schedule to exclude the first asset tag from the first asset tag group. Generally, in Blocks S170 and S172, the system can identify an asset tag to be reassigned from a first asset tag group to a new asset tag group and exclude the identified asset tag from the first asset tag group. In one example, the system can identify the first asset tag for reassignment from a first asset tag group based on a frequency of movement first asset tag exceeding the frequency of movement of an average asset tag in the first asset tag group. Generally, the system can reassign the first asset tag to an existing asset tag group with one or more asset tags or to a new asset tag group where the first asset tag will be a single asset tag. In response to reassigning the first asset tag to a new asset tag group where the first asset tag is a single asset tag, the system can transmit unicast triggers to the new asset tag group. By regrouping the asset tags based on the currently derived position, the system can prioritize monitoring of certain tags over other tags.

For example, merchandise in a first area in a warehouse may have a higher likelihood of being stolen than merchandise in a second area of the warehouse. Therefore, the system can allocate asset tags in the first area to a first asset tag group and asset tags in the second area to a second asset tag group. The system can also transmit multicast triggers to the first asset tag group more frequently than to the second asset tag group. Thus, the system can prioritize asset tags in the first area by grouping the asset tags in the first area into the first asset tag group.

In one implementation, the system can remove an asset tag from an asset tag group and allocate the tag into a different asset tag group, responsive to receiving a ranging signal from the asset tag based on the recovery schedule. More specifically, the controller can detect that the asset tag has moved away from the subset of asset tags in the asset tag group by a distance exceeding a threshold distance (e.g., 20 m) for the asset tag group based on the position. For example, the controller can: derive the first position of the first asset tag based on the first ranging signal; responsive to the first position exceeding a threshold distance from a target distance range for the first asset tag group, remove the first asset tag from the first asset tag group; allocate the first asset tag to a second asset tag group; assign the first asset tag a unique identifier associated with the second asset tag group; and transmit a second response schedule to the first asset tag associated with the second asset tag group. Therefore, the system can reallocate asset tags into other asset tag groups based on proximities to asset tags in other asset tag groups.

In one implementation, the system can identify the first asset tag (e.g., the first asset tag to be regrouped) in the first asset tag group based on the first location (e.g., current location) of the asset tag. For example, the system can compute a distance between the first location of the first asset tag and a reference position of the first asset tag group. In this example, the reference position defines an area associated with the asset tag group such that each asset tag in the first asset tag group is positioned within a threshold distance of the reference position. In response to the distance between the first location of the first asset tag and the reference position exceeding the threshold distance, the system can detect that the first asset tag is located outside an area occupied by the first asset tag group. Therefore, the system can identify an asset tag located outside of an area associated with an asset tag group of the asset tag. In response to identifying the asset tag located outside of the area associated with the group of the asset tag, the system can reassign the asset tag to a new group.

In one implementation, the system can: identify a first distance between a current location of the asset tag (e.g., location derived at a first time) and a previous location of the asset tag (e.g., location derived at a second time preceding the first time), the first distance representing a distance traveled by the first asset tag during a first time period between the second time and the first time; based on the first distance and the first time period, calculate a velocity of the first asset tag in a target environment; and, in response to the velocity of the first asset tag exceeding a target velocity of asset tags in the target environment, identify the first asset tag to be reassigned from the first asset tag group. Therefore, the system can reassign an asset tag to a new group in response to the asset tag exhibiting atypical motion behavior, such as atypically high velocity. The system can reassign an asset tag exhibiting atypical behavior to a new group to track this asset tags more closely and to prevent possible theft of this asset tag and an associated object.

In one implementation, at a first time, the system can receive a first ranging signal from a second asset tag in the first asset tag group. In this implementation, in response to the first time not intersecting any wake window in the first set of wake windows, the system can update the first response schedule to exclude the second asset tag from the first asset tag group and generate a third response schedule for the second asset tag. In this implementation, the system excludes the second asset tag from the first asset tag group in response to receiving a ranging signal from the second asset tag, the ranging signal not following (e.g., not responsive to) a trigger. Generally, an asset tag can transmit a ranging signal not following a trigger in response to the asset tag receiving a motion sensor signal. Theretofore, the system can exclude an asset tag from the first asset tag group and reassign the asset tag to a new group in response to the asset tag receiving a motion sensor signal.

In one implementation, the system can, at the first time: for the second asset tag group in the set of asset tag groups, generate a second response schedule defining a third set of multicast triggers; and, for the first asset tag group in the set of asset tag groups, generate a first response schedule defining the first set of multicast triggers. In this implementation, the system defines the first asset tag group based on proximity to a first node, in the set of nodes, and the second asset tag group based on proximity to a second node, in the set of nodes. In this implementation, at the second time, the set of nodes can: broadcast a third multicast trigger of the third set of multicast triggers; receive a second set of ranging signals from a second asset tag group responsive to the third multicast trigger; derive a third set of locations of the second asset tag group based on the second set of ranging signals; and, in response to a second asset tag being positioned closer to the first node than to the second node, updating the first response schedule and the second response schedule to exclude the second asset tag from the second asset tag group and include the second asset tag in the first asset tag group. Therefore, the system can reassign the second asset tag from the second asset tag group to the first asset tag group in response to the second asset tag being located closer to the first node, which defines an anchor for the first asset tag group, than to the second node, which defines an anchor for the second asset tag group.

6. Example Implementations

In one example implementation of the method S100, an asset tag may not receive a trigger (e.g., unicast trigger, multicast trigger) due to a clock error of the first asset tag causing the first asset tag to remain in the sleep mode when the trigger is sent. In another example implementation of the method S100, an asset tag may not receive a trigger (e.g., unicast trigger, multicast trigger) due to scattering and/or obstruction of the trigger signal by objects in the target environment. In another example implementation of the method S100, one or more nodes in the set of nodes may not receive a ranging signal transmitted by the asset tag with a sufficiently high signal-to-noise ratio to decode the asset tag identifier information included in the ranging signal.

6.1 Example: Subset of Nodes with Poor Reception

Generally, certain nodes, in the set of nodes, can receive the ranging signal with low signal strength (e.g., due to interference), while other nodes, in the set of nodes, can receive the ranging signal with a high signal strength (e.g., due to proximity to the asset tag). The nodes that receive the ranging signal with a signal strength below a signal strength threshold can not decode information, such as asset tag identifier, contained in the ranging signal (e.g., due to signal-to-noise ratio of the ranging signal being low). These nodes can only derive the time of arrival of the ranging signal. However, nodes that receive the ranging signal with a signal strength above the signal strength threshold, can decode the information, such as asset tag identifier, contained in the ranging signal. Upon receipt of the ranging signal, every node, in the set of nodes, that received an instance of the ranging signal can transmit the information decoded and derived from the ranging signal to other nodes in the set of nodes. Therefore, a node that can not decode asset tag identifier of a ranging signal can access this information by communicating with other nodes in the set of nodes.

In one implementation, a first node in a set of nodes can: broadcast the first multicast trigger at the first multicast trigger time, in the first set of multicast trigger times, defined by the first response schedule; receive a first set of ranging signals (e.g., with a signal strength exceeding a first signal strength threshold) from a first asset tag subgroup in the first asset tag group; and transmit a first set of asset tag data of the first asset tag subgroup to the set of nodes. In this implementation, a second node in the set of nodes can: receive a second set of ranging signals (e.g., with a signal strength exceeding a first signal strength threshold) from a second asset tag subgroup in the first asset tag group; and transmit a second set of asset tag data of the second asset tag subgroup to the set of nodes. Further, the system can derive a second set of locations of the first asset tag group based on the first set of asset tag data and the second set of asset tag data. Therefore, the first node can receive a signal with a signal strength exceeding a threshold signal strength, from a portion of asset tags in the first asset tag group. In addition, the second node can receive a signal with a signal strength exceeding the threshold signal strength, ranging signals from another portion of asset tags in the first asset tag group. In response to receiving signals with signal strengths exceeding the threshold signal strength, the first node and the second node can decode information (e.g., asset tag identifier, asset tag group identifier) contained in the ranging signals received, and transmit this information to the set of nodes. Thus, even if some nodes do not receive ranging signals from a subset of asset tags in the first asset tag group (or receive these ranging signals with low signal strength), the system can access information contained in these ranging signals (e.g., asset tag identifier, asset tag group identifier) and derive locations of asset tags in the subset of asset tags due to other nodes, in the set of nodes, receiving these ranging signals with a high signal strength and transmitting the information to the set of nodes.

In particular, upon receiving ranging signals with a signal strength exceeding a signal strength threshold, each node, in the set of nodes, can derive the asset tag identifier and group identifier contained in the signal and record the time of arrival of the signal. Then, each node in the set of nodes can transmit this information to other nodes in the set of nodes. For example, a first node in the set of nodes can, for each ranging signal in the first set of ranging signals: decode a first asset tag identifier and a first group identifier contained in the ranging signal; record a first time of arrival of the ranging signal; and transmit the first asset tag identifier, the first group identifier, and the first time of arrival into the first set of asset tag data. In this example, a second node can, in the set of nodes, for each ranging signal in the second set of ranging signals: decode a second asset tag identifier and a second group identifier contained in the ranging signal; record a second time of arrival of the ranging signal; and transmit the second asset tag identifier, the second group identifier, and the second time of arrival into the first set of asset tag data.

In one implementation, two nodes can receive the same ranging signal with different signal strengths. In particular, one node can receive the ranging signal with a signal strength below a signal strength threshold, while another node can receive the ranging signal with a signal strength above the signal strength threshold. The node that receives the ranging signal with a signal strength above a signal strength threshold can decode the asset tag identifier and group identifier associated with the ranging signal, while the node that receives the ranging signal with a signal strength below a signal strength threshold can only resolve the time of arrival (and derive time of flight) of the ranging signal. Therefore, in this example, even if one node receives the ranging signal with low signal strength (or low signal-to-noise ratio), the system can access information associated with the ranging signal as long as another node receives the ranging signal with high signal strength. For example, a third node in the set of nodes can: receive a first ranging signal from a first asset tag with a first signal-to-noise ratio below a signal-to-noise ratio threshold; and, in response to receiving a first ranging signal with the first signal-to-noise ratio below the signal-to-noise ratio threshold, transmit a first time of arrival of the ranging signal to the set of nodes. In this example, a fourth node (e.g., another node), in the set of nodes, can: receive the first ranging signal from a first asset tag with a second signal-to-noise ratio exceeding the signal-to-noise ratio threshold; and, in response to receiving the first ranging signal with the second signal-to-noise ratio exceeding the signal-to-noise ratio threshold, transmit an asset tag identifier, a group identifier, and a second time of arrival of the first asset tag to the set of nodes. The system can then derive a first location of the first asset tag based on the asset tag identifier, the group identifier, the first time of arrival, and the second time of arrival of the first asset tag.

6.2 Example: Asset Tag Fails to Transmit a Ranging Signal

In one implementation, a first node in the set of nodes can, during a second time period: broadcast the first multicast trigger at the first multicast trigger time defined by the first response schedule. In this implementation, the set of nodes can: receive a first set of ranging signals from a first asset tag subgroup in the first asset tag group, the first asset tag subgroup responsive to the first multicast trigger; in response to identifying a first asset tag that is included in the first asset tag group and excluded from the first asset tag subgroup based on the first set of ranging signals, generate a recovery schedule for the first asset tag, the recovery schedule defining a sequence of unicast trigger times for transmission of a sequence of unicast triggers to the first asset tag; at the first node in the set of nodes, broadcast the sequence of unicast triggers at the sequence of unicast trigger times according to the recovery schedule; and at the set of nodes, in response to receiving a first ranging signal from the first asset tag, derive a first location of the first asset tag based on the first ranging signal. Therefore, in response to not receiving a ranging signal from the first asset tag responsive to the multicast trigger, the set of nodes can generate a recovery schedule for the asset tag. The system can then—via the set of nodes—transmit a series of unicast triggers to the first asset tag. In response to receiving the ranging signal from the first asset tag responsive to the unicast trigger, the set of nodes can derive the location of the first asset tag.

In one implementation, the set of nodes can, during the second time period: based on receipt time of the first ranging signal, characterize clock drift of a first clock of the first asset tag; and based on the clock drift, update the first response schedule by updating the third wake window for the first asset tag such that the third wake window intersects the second multicast trigger time. Therefore, the set of nodes can address the clock error of the first asset tag by updating the response schedule for the first asset tag. In particular, the system can shift the wake windows of the first asset tag by a clock drift duration (e.g., difference between system time of the set of nodes and clock time of the first asset tag) in order to enable the first asset tag to enter the wake mode and receive the multicast trigger.

In another implementation, a first node in the set of nodes can, during a second time period intersecting the second trigger time, broadcast the second multicast trigger via a ranging channel. In this implementation, the system also can, at the first asset tag: enter wake mode; in response to not receiving the second multicast trigger via the ranging channel, transition the transceiver to the configuration channel; receive a second configuration message via the configuration channel; and, based on the configuration message, update a first clock of the first asset tag to a system time of the set of nodes. Therefore, an asset tag can, in response to not receiving a multicast trigger from a set of nodes, seek a configuration message from the set of nodes, the configuration message specifying a response schedule for the asset tag and a system time of the set of nodes. Once the asset tag receives the configuration message, the asset tag can, for example, update a clock of the asset tag to a system time of the set of nodes.

In one variation, the population of nodes can receive a set of reference signals from a portion of the asset tags in the asset tag group. For example, at the second time the population of nodes can receive a first set of reference signals from a first subset of asset tags in the first asset tag group, and the controller can derive positions of the first subset of asset tags based on the first set reference signals. Therefore, the system can detect absence of reference signals from a subset of asset tags in a particular asset tag group due to asset tag communication errors and recover reference signals not received from the subset of asset tags.

In this variation, responsive to absence of ranging signals received from a particular asset tag, the system can transmit a subsequent ranging signal to the set of nodes based on a recovery schedule. More specifically, the particular asset tag may have failed to transmit a ranging signal back to the node responsive to the multicast trigger: because the asset tag transitioned from an "awake" state to a "sleep" state prior to the wake window or transitioned from a "sleep" state to an "awake" state after the wake window (e.g., due to internal clock drift within the particular asset tag) and therefore failed to receive the multicast trigger from the node. Thus, in response to failure to receive a ranging signal from the particular asset tag during the wake window assigned to the particular asset tag, the system can define a recovery schedule that, when executed by the particular asset tag, trigger the asset tag to transmit a ranging signal to the node and recalibrate a clock associated with the asset tag.

In one implementation, the system can identify asset tags in the asset tag group that failed to transmit ranging signals to the set of nodes based on the response schedule for the asset tag group. More specifically, responsive to identifying an asset tag excluded from the first subset of asset tags, the system can define a recovery schedule for the asset tag based on the wake window and the multicast trigger time of the response schedule. For example, the controller can: in response to identifying a first asset tag in the first asset tag group excluded from the first subset of asset tags, define a first recovery schedule for the first asset tag including a sequence of unicast trigger times offset by less than the wake window and neighboring the multicast trigger time, and transmit the first recovery schedule to the set of nodes. In this example, the recovery schedule defines a set of unicast trigger times, for the asset tag excluded from the subset of asset tags, at an interval overlapping the wake window both prior to and following the multicast trigger time. For example, at the first time, the controller can define the response schedule specifying a multicast trigger time of 12:00:30, and a 20 second wake window specifying—a wake time start (12:00:20), and a wake time end (12:00:40)— and, during the second period of time, define the recovery schedule for the first asset tag specifying the sequence of unicast trigger times offset by less than the wake window (7 seconds) and neighboring the multicast trigger time (12:00:14, 12:00:21, 12:00:28, 12:00:35, etc.). Therefore, the system can define a recovery schedule for the asset tag excluded from the first subset of asset tags to trigger response by the asset tag responsive to the asset tag failing to transmit a ranging signal to the set of nodes during the trigger time associated with the tag.

6.2.1 Node-Side Recovery

In one implementation, the system can recalibrate a clock associated with the asset tag to recover ranging signals from the asset tag. More specifically, the system can transmit a set of unicast triggers to the asset tag based on the recovery schedule to trigger transmission of ranging signals to a node. In this implementation, responsive to receiving a ranging signal from the asset tag, the system can recalibrate a clock of the asset tag to reduce or eliminate clock drift responsible for the asset tag failing to transmit a ranging signal during the wake window by resetting the clock to a true time associated with the multicast trigger time. For example, the first node in the set of nodes can: broadcast a sequence of unicast triggers to the first asset tag at the sequence of unicast trigger times according to the first recovery schedule; and, in response to receipt of a first ranging signal from the first asset tag, recalibrate a first clock of the first asset tag. The controller can, in response to receipt of the first ranging signal from the first asset tag by the first set of nodes, derive a first position of the first asset tag based on the first ranging signal. Therefore, the system can reduce or prevent subsequent failures, by the asset tag, to transmit a ranging signal to a node at the asset tag-specific trigger time, responsive to receiving a multicast trigger at the multicast trigger time.

In one implementation, a node in the set of nodes can perform the function of the controller.

6.2.2 Missing Tag Diagnostics

In one implementation, responsive to identifying absence of ranging signals from a subset of asset tags, the system can: trigger an operator to investigate the asset tag (e.g., to identify asset tag displacement, damage); automatically remove the asset tag from the asset tag group; trigger reset of the asset tag to a setup period; and reintegrate the asset tag into the asset tag group. Therefore, the system can account for the asset tag and trigger repair and/or reintegration of the asset tag into the target environment for tracking.

6.2.3 Tag-Side Recalibration

In one implementation, responsive to detecting absence of a ranging signal from a subset of asset tags in the asset tag group, the system can recalibrate an internal clock of each asset tag in the subset of asset tags. More specifically, the first asset tag can automatically recalibrate the clock associated with the first asset tag based on the unicast trigger broadcast by the first node according to the recovery schedule. In this implementation, each unicast trigger contains a representation of the true time—unaffected by clock drift. For example, at the second time, the first node in the set of nodes can: broadcast a sequence of unicast triggers to the first asset tag at the sequence of unicast trigger times according to the first recovery schedule; and the first asset tag can: extract a true time associated with the unicast trigger based on a time of arrival of the unicast trigger; respond to the unicast trigger by transmitting a first ranging signal to the first node, and update the first clock of the first asset tag based on the true time. Therefore, the asset tag can self-recalibrate the internal clock of the asset tag based on a true clock time inherent in the unicast trigger in response to receiving a unicast trigger based on the recovery schedule.

In one implementation, the asset tag can automatically recalibrate the first clock of the first asset tag based on ranging signals sent by other asset tags in the asset tag group. For example, the first asset tag can: intercept a ranging signal transmitted by a second asset tag in the asset tag group at an accurate trigger time associated with the second asset tag; correlate the ranging signal to a stored schedule to verify the correct trigger time for the first asset tag; update the clock of the first asset tag; and transmit the ranging signal to a node based on the schedule. Therefore, the asset tag can recalibrate the clock associated with the asset tag based on ranging signals of other asset tags in the asset tag group by transmitting ranging signals with accurate trigger times.

In one implementation, the system can recalibrate the clock of the asset tag responsive to detecting a number of consecutive failures exceeding a threshold failure count. More specifically, in response to detecting a set of consecutive failures (e.g., two) of ranging signal transmissions from the first asset tag, the system can: transition the first asset tag to a calibration channel to query for the current (e.g., true) time; detect the current time; and recalibrate the clock based on the current time. Therefore, rather than relying on a node to broadcast unicast triggers to the asset tag, the asset tag can query behavior of other asset tags in the asset tag group and recalibrate the clock of the first asset tag based on the other asset tags. Additionally, or alternatively, the asset tag can query behavior of a node or a set of nodes in communication with the asset tag and recalibrate the clock of the first asset based on timestamp data (e.g., a true clock time) sent from the node or the set of nodes to the first asset tag.

6.3 Example: Correcting Asset Tag Clock Error

For example, at the first time, the controller can define a response schedule for an asset tag group specifying: a multicast trigger time (00:00:00), a wake window (e.g., 20 seconds) characterizing—a wake time start (23:59:50), and a wake time end (00:00:10)— and a target transmit time for each asset tag—AT—in the asset tag group based on the wake window (AT1—00:00:02, AT2—00:00:04, AT3—00:00:06, AT4—00:00:08, and AT5—00:00:10). In this example, at a second time, a first node in the set of nodes can broadcast a multicast trigger at the multicast trigger time (00:00:00). The set of nodes can then receive a set of ranging signals from a first subset of asset tags in the first asset tag group (receive from AT1 at 00:00:02, receive from AT2 at 00:00:04, receive from AT3 at 0:00:06, and receive from AT5 at 00:00:10). The controller can then identify a first asset tag in the first asset tag group excluded from the first subset of asset tags (AT4). Therefore, the system can detect that first subset of asset tags in the first asset tag group (AT1, AT2, AT3, and AT5) are functioning and present in the target environment, thereby indicating successful broadcast of the multicast trigger from the first node in the set of nodes to the first asset tag group. Thus, the system can detect absence and/or potential malfunction of an asset tag in an asset tag group responsive to identifying absence of ranging signals from a subset of asset tags.

6.3.1 Example Node-Side Recovery and Schedule Correction

In one implementation, the system can characterize a clock time error (e.g., clock drift) based on a clock time associated with the asset tag and a true clock time to correct the response schedule for the asset tag group. For example, the controller can: for a first asset tag in the asset tag group, compute a difference between a first time associated with an asset tag and a second time characteristic of a true clock time; characterize a clock drift interval based on the difference; and update the response schedule for the first asset tag to include a wake window for the asset tag that begins earlier than the first wake window. In one variation, in response to detecting an expedited (e.g., fast) clock, the controller can redefine the response schedule to include a wake window that begins later than the first wake window. In one variation, the controller can redefine the response schedule to include a wake window longer than the first wake window in the first response schedule.

6.3.2 Example Tag-Side Recovery and Correction

In one implementation, the asset tag can automatically self-correct the clock associated with the asset tag in response to the controller detecting a clock drift. For example, during the second time, asset tag AT4 entered the "awake" state after the awake window specified by the response schedule (e.g., the asset tag woke up too late) and failed to receive the multicast trigger at the multicast trigger time. In this example, while the asset tag is in the "awake" state (e.g., the asset tag woke up after the wake window), the asset tag can intercept ranging signals from other asset tags in the asset tag group directed to the node that are transmitting ranging signals at accurate corresponding trigger times based on the true multicast trigger time (00:00:00). In this example, the clock of the asset tag (AT4) drifted (e.g., slowed) by ii seconds and entered the "awake" state at 00:00:01 (should have entered the "awake" state at 23:59:50). Thus, asset tag AT4 is in an "awake" state during a trigger time of asset tag AT1 at 0:00:02. Therefore, asset tag AT4 can intercept the ranging signal transmitted by asset tag AT1 during the trigger time associated with asset tag AT1; associate the ranging signal to a stored schedule to verify that the ranging signal should have been transmitted at a true time 00:00:02; update the clock associated with asset tag AT4 to 00:00:02 (e.g., from the 23:59:51 that asset tag AT4 assumes due to drift); and transmit a ranging signal at 00:00:08 per the schedule. Therefore, the asset tags can self-recalibrate by intercepting ranging signals transmitted by other asset tags in the asset tag group during correct trigger times. Additionally, or alternatively, the asset tags can self-recalibrate by intercepting ranging signals transmitted by nodes in the set of nodes during correct trigger times.

7.0 Example Target Environments

Generally, the system can execute the method S100 to group and track asset tags deployed across a target environment, such as—a construction site, a grocery store, a warehouse, a fulfillment center, etc. For example, the system can execute the method S100 to group and track asset tags deployed on a construction site to monitor movement of equipment (e.g., a crane, a bulldozer, an excavator, etc.) and/or resources (lumber, bags of cement, bundles of rebar, etc.). In another example, the system can execute the method S100 to group and track asset tags deployed in a military stock-keeping warehouse characteristic of low throughput (e.g., low frequency of delivery/production), and stock of high per-unit value (e.g., artillery, armor). In this example, asset tags can be coupled to individual items (e.g., equipment) of high value. In another example, the system can execute the method S100 to group and track asset tags deployed in a fulfillment center characteristic of high throughput (e.g., high frequency of orders within a period of time), and stock of low per-unit value (e.g., consumer merchandise). In this example, asset tags can be coupled to containers of goods rather than individual goods.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
during a first time period:
  generating a response schedule for a first asset tag, the response schedule defining:
    a sequence of trigger times for transmitting a sequence of unicast triggers; and
    a sequence of wake windows, each wake window in the sequence of wake windows intersecting a trigger time in the sequence of trigger times;
  at a first node in a set of nodes:
    broadcasting a first configuration message to the first asset tag via a configuration channel, the first configuration message comprising the response schedule;
  at the first asset tag:
    in response to absence of configuration data, transitioning a transceiver of the first asset tag to the configuration channel;
    receiving the first configuration message via the configuration channel;
    configuring the first asset tag based on the first configuration message; and
    in response to a time duration until a first wake window, in the sequence of wake windows, exceeding a threshold time duration, entering a sleep mode; and
during a second time period:
  at the first node in the set of nodes,
    based on a first trigger time in the sequence of trigger times, broadcasting a first unicast trigger, in the sequence of unicast triggers, via a ranging channel;
  at the first asset tag:
    based on the first wake window, in the sequence of wake windows, entering a wake mode;
    in response to receiving the first unicast trigger via the ranging channel, transmitting a first ranging signal; and
    in response to transmitting the first ranging signal, entering the sleep mode; and
  at the set of nodes:
    receiving the first ranging signal; and
  deriving a first location of the first asset tag during the second time period based on instances of the first ranging signal received by the set of nodes.

2. The method of claim 1:
wherein broadcasting the first configuration message to the first asset tag via the configuration channel comprises:
  broadcasting the first configuration message to the first asset tag via the configuration channel associated with a first frequency; and
wherein broadcasting the first unicast trigger via the ranging channel comprises:
  broadcasting the first unicast trigger via the ranging channel associated with a second frequency range excluding the first frequency.

3. The method of claim 1:
wherein entering the sleep mode comprises, by the first asset tag:
  disabling the transceiver of the first asset tag;
  transitioning a processor of the first asset tag into a hibernate mode; and maintaining power supply from a battery of the first asset tag to a clock and a motion sensor of the first asset tag; and wherein entering the wake mode comprises, by the first asset tag:
enabling the transceiver of the first asset tag; and
transitioning the processor of the first asset tag into an active mode.

4. The method of claim 1, further comprising:
during a third time period:
at the first node in the set of nodes:
based on a second trigger time in the sequence of trigger times, broadcasting a second unicast trigger, in the sequence of unicast triggers, via the ranging channel;
at the first asset tag:
based on a second wake window, in the sequence of wake windows, entering the wake mode;
in response to receiving the second unicast trigger via the ranging channel, transmitting a second ranging signal; and
in response to transmitting the second ranging signal, entering the sleep mode; and
at the set of nodes:
receiving the second ranging signal; and
deriving a second location of the first asset tag based on instances of the second ranging signal received by the set of nodes.

5. The method of claim 1, further comprising, during a third time period:
at the first node in the set of nodes:
based on a second trigger time in the sequence of trigger times, broadcasting a second unicast trigger via the ranging channel; and
at the first asset tag:
based on a second wake window in the sequence of wake windows, entering the wake mode;
in response to absence of receipt of the second unicast trigger via the ranging channel, transitioning the transceiver of the first asset tag to the configuration channel;
receiving a second configuration message comprising system time of the set of nodes, via the configuration channel; and
based on the second configuration message, updating a clock of the first asset tag according to the system time of the set of nodes.

6. The method of claim 1:
further comprising distributing an encryption key to the first asset tag;
wherein broadcasting the first configuration message to the first asset tag via the configuration channel comprises:
generating an encrypted configuration message by encrypting the first configuration message; and
broadcasting the encrypted configuration message to the first asset tag via the configuration channel; and
wherein receiving the first configuration message via the configuration channel comprises:
decrypting the encrypted configuration message via the encryption key.

7. The method of claim 1:
wherein receiving the first configuration message via the configuration channel comprises:
accessing the response schedule in the first configuration message; and
accessing a first asset tag identifier in the first configuration message; and
wherein configuring the first asset tag based on the first configuration message comprises:
in response to the first asset tag identifier in the first configuration message matching a second asset tag identifier of the first asset tag:
synchronizing a clock of the first asset tag to a system time of the set of nodes; and
configuring the first asset tag to transition between the sleep mode and the wake mode according to the response schedule.

8. A method comprising:
during a first time period:
generating a response schedule for a first asset tag, the response schedule defining:
a first trigger time for transmitting a first unicast trigger;
a first wake window intersecting the first trigger time; and
a second wake window associated with a motion sensor signal;
at a first node in a set of nodes:
broadcasting a configuration message, comprising the response schedule, to the first asset tag via a configuration channel;
at the first asset tag:
in response to absence of configuration data, transitioning a transceiver of the first asset tag to the configuration channel;
receiving the configuration message via the configuration channel;
configuring the first asset tag based on the configuration message; and
in response to a time duration until the first wake window exceeding a threshold time duration, entering a sleep mode; and
during a second time period:
at the first asset tag:
in response to receiving the motion sensor signal from a motion sensor in the first asset tag:
entering a wake mode for a duration of the second wake window; and
transmitting a first ranging signal via a ranging channel during the second wake window; and
in response to transmitting the first ranging signal, entering the sleep mode; and
at the set of nodes:
receiving the first ranging signal; and
deriving a first location of the first asset tag based on instances of the first ranging signal received by the set of nodes.

9. The method of claim 8, further comprising:
during a third time period preceding the second time period:
at the first node in the set of nodes, broadcasting the first unicast trigger via the ranging channel;
at the first asset tag:
entering the wake mode for a duration of the first wake window;
in response to receiving the first unicast trigger via the ranging channel, transmitting a second ranging signal via the ranging channel; and
in response to transmitting the second ranging signal, entering the sleep mode; and at the set of nodes:
  receiving the second ranging signal; and
deriving a second location of the first asset tag based on instances of the second ranging signal received by the set of nodes.

10. The method of claim 8, further comprising, during the first time period:
at the first asset tag:
  in response to receiving a series of motion sensor signals indicating that the first asset tag is in motion:
    entering the wake mode;
    transmitting a series of ranging signals at a time interval specified by the response schedule via the ranging channel; and
    entering the sleep mode; and
at the set of nodes:
  receiving the series of ranging signals; and
  deriving a first series of locations of the first asset tag based on the instances of the series of ranging signals received by the set of nodes.

11. The method of claim 8, further comprising:
prior to the first time period:
  at the first asset tag:
    receiving a set of unicast queries from the set of nodes; and
    transmitting a unicast response to the set of nodes; and
  at the set of nodes:
    calculating a second location of the first asset tag based on instances of the unicast response received by the set of nodes.

12. The method of claim 11, further comprising:
calculating a distance between the first location and the second location of the first asset tag;
in response to the distance exceeding a threshold distance, generating a notification indicating that an asset associated with the first asset tag has been moved by the distance exceeding the threshold distance; and
transmitting the notification to a device of an operator of a target environment containing the first asset tag.

13. The method of claim 8, wherein deriving the first location of the first asset tag comprises:
for each node in the set of nodes:
  based on a time of flight of the first ranging signal received by the node, deriving a distance, in a set of distances, between the first asset tag and the node; and
at the set of nodes, deriving the first location of the first asset tag based on the set of distances.

14. The method of claim 8:
wherein receiving the configuration message via the configuration channel comprises:
  at the first asset tag:
    receiving the configuration message via a first frequency associated with the configuration channel; and
  wherein transmitting the first ranging signal via the ranging channel comprises transmitting the first ranging signal at second frequency within a second frequency range excluding the first frequency.

15. A method comprising:
during a first time period:
  generating a response schedule for a first asset tag group, the response schedule defining:
    a first multicast trigger time for transmission of a first multicast trigger to the first asset tag group; and
    for each asset tag in the first asset tag group:
      a first wake window intersecting the first multicast trigger;
      a first transmit time succeeding receipt of the first multicast trigger and unique to the asset tag; and
      a second wake window intersecting the first transmit time;
  at a first node in a set of nodes:
    broadcasting a first configuration message via a configuration channel to the first asset tag group; and
  at a first asset tag in the first asset tag group:
    in response to absence of configuration data, transitioning a first transceiver of the first asset tag to the configuration channel;
    receiving the first configuration message via the configuration channel;
    configuring the first asset tag based on the first configuration message; and
    based on the response schedule indicating that a first time duration until the first wake window exceeds a threshold time duration, entering a sleep mode;
during the first wake window:
  at the first node in the set of nodes:
    broadcasting the first multicast trigger via a ranging channel; and
  at the first asset tag in the first asset tag group:
    entering a wake mode;
    receiving the first multicast trigger via the ranging channel; and
    based on the response schedule indicating that a second time duration until the second wake window exceeds the threshold time duration, entering the sleep mode; and
during the second wake window:
  at the first asset tag in the first asset tag group:
    entering the wake mode;
    transmitting a first ranging signal via the ranging channel; and
    in response to transmitting the first ranging signal, entering the sleep mode;
  at the set of nodes:
    receiving a first set of ranging signals from the first asset tag group; and
    deriving a first set of locations of the first asset tag group based on the first set of ranging signals received by the set of nodes.

16. The method of claim 15:
wherein receiving the first configuration message via the configuration channel comprises:
  accessing the response schedule in the first configuration message;
  accessing a first asset tag identifier in the first configuration message; and
  accessing a first group identifier in the first configuration message; and
wherein configuring the first asset tag based on the first configuration message comprises:
  in response to the first asset tag identifier in the first configuration message matching a second asset tag identifier of the first asset tag and in response to the first group identifier in the first configuration message matching a second group identifier of the first asset tag group:
    configuring the first asset tag to transition between the sleep mode and the wake mode according to the response schedule.

17. The method of claim 15, further comprising:
during the first time period:
- at a second asset tag in the first asset tag group:
  - in response to absence of the configuration data, transitioning a second transceiver of the second asset tag to the configuration channel;
  - receiving the first configuration message via the configuration channel;
  - configuring the second asset tag based on the first configuration message; and
  - based on the response schedule indicating that the first time duration until the first wake window exceeds the threshold time duration, entering the sleep mode; and
during a second time period:
- at the second asset tag in the first asset tag group:
  - entering the wake mode;
  - in response to the first wake window overlapping the second wake window, transmitting a second ranging signal; and
  - in response to transmitting the second ranging signal, entering the sleep mode.

18. The method of claim 15, further comprising, during a second time period succeeding the first time period:
at the first asset tag in the first asset tag group:
- in response to receiving a motion sensor signal indicating that the first asset tag is in motion:
  - entering the wake mode for a duration of the second wake window;
  - transmitting a second ranging signal; and
  - in response to transmitting the second ranging signal, entering the sleep mode.

19. The method of claim 15, further comprising, prior to the first time period:
at the first asset tag:
- receiving a set of unicast queries from the set of nodes; and
- transmitting a unicast response, in a set of unicast responses, to the set of nodes; and
at the set of nodes:
- calculating a second location of the first asset tag based on the set of unicast responses; and
- assigning the first asset tag to the first asset tag group based on the second location.

20. The method of claim 15:
wherein generating the response schedule for the first asset tag group comprises:
- generating the response schedule for the first asset tag group comprising:
  - a second multicast trigger time for transmission of a second multicast trigger; and
further comprising, during a second time period intersecting the second multicast trigger time:
at the first node in the set of nodes:
- broadcasting the second multicast trigger via the ranging channel; and
at the first asset tag:
- entering the wake mode;
- in response to not receiving the second multicast trigger via the ranging channel, transitioning the first transceiver to the configuration channel;
- receiving a second configuration message via the configuration channel; and
- based on the second configuration message, updating a first clock of the first asset tag to a system time of the set of nodes.

* * * * *